United States Patent
Chang et al.

(10) Patent No.: US 12,034,222 B2
(45) Date of Patent: Jul. 9, 2024

(54) ELECTROMAGNETIC WAVE TRANSMISSION STRUCTURE

(71) Applicant: TMY Technology Inc., Taipei (TW)

(72) Inventors: Su-Wei Chang, Taipei (TW);
Sheng-Fuh Chang, Chiayi (TW);
Chia-Chan Chang, Chiayi (TW);
Shih-Cheng Lin, Taitung County (TW);
Yuan-Chun Lin, Hsinchu County (TW)

(73) Assignee: TMY Technology Inc., Taipei (TW)

( * ) Notice: Subject to any disclaimer, the term of this patent is extended or adjusted under 35 U.S.C. 154(b) by 223 days.

(21) Appl. No.: 17/880,606

(22) Filed: Aug. 3, 2022

(65) Prior Publication Data

US 2023/0028993 A1    Jan. 26, 2023

Related U.S. Application Data

(63) Continuation-in-part of application No. 17/159,294, filed on Jan. 27, 2021, now Pat. No. 11,784,703.
(Continued)

(30) Foreign Application Priority Data

Aug. 18, 2020   (TW) ................... 109128106
Dec. 23, 2021   (TW) ................... 110148503

(51) Int. Cl.
*H01Q 3/44*    (2006.01)
*H01Q 9/04*    (2006.01)
(Continued)

(52) U.S. Cl.
CPC ............. *H01Q 3/44* (2013.01); *H01Q 9/0407* (2013.01); *H01Q 13/206* (2013.01);
(Continued)

(58) Field of Classification Search
CPC .......... H01Q 3/44; H01Q 3/443; H01Q 9/285; H01Q 9/0407; H01Q 13/20; H01Q 13/206;
(Continued)

(56) References Cited

U.S. PATENT DOCUMENTS

2019/0326682 A1   10/2019   Qin
2020/0044300 A1   2/2020    Golden et al.
(Continued)

FOREIGN PATENT DOCUMENTS

CN     101454941     11/2013
CN     108711669     10/2018
(Continued)

OTHER PUBLICATIONS

"Notice of Allowance of Taiwan Counterpart Application," issued on Nov. 9, 2022, p. 1-p. 5, in which the listed reference was/references were cited.

*Primary Examiner* — Robert Karacsony
(74) *Attorney, Agent, or Firm* — JCIPRNET

(57) ABSTRACT

An electromagnetic wave transmission structure including a substrate, at least one transmission line, antennas, and tunable dielectric units is provided. The transmission line includes a first extending portion and second extending portions. The first extending portion is extended in a first direction. The second extending portions are respectively extended from two opposite edges of the first extending portion, and an extending direction thereof is parallel to a second direction. The second extending portions are arranged along the first direction. The antennas are disposed near the at least one transmission line. The tunable dielectric units are overlapped with portions of the at least one transmission line located between the antennas. Each tunable dielectric unit has an overlapped first electrode layer and controllable dielectric layer. The controllable dielectric
(Continued)

layer is disposed between the first electrode layer and the at least one transmission line.

14 Claims, 19 Drawing Sheets

Related U.S. Application Data

(60) Provisional application No. 63/254,537, filed on Oct. 12, 2021, provisional application No. 63/241,503, filed on Sep. 7, 2021.

(51) Int. Cl.
  *H01Q 13/20* (2006.01)
  *H01Q 15/02* (2006.01)
  *H01Q 25/00* (2006.01)
  *H04B 7/145* (2006.01)

(52) U.S. Cl.
  CPC ........... *H01Q 15/02* (2013.01); *H01Q 25/005* (2013.01); *H04B 7/145* (2013.01)

(58) Field of Classification Search
  CPC ...... H01Q 13/26; H01Q 13/28; H01Q 21/005; H01Q 25/005; H04B 7/145; H04B 7/2606
  See application file for complete search history.

(56) References Cited

U.S. PATENT DOCUMENTS

| | | |
|---|---|---|
| 2020/0257149 A1 | 8/2020 | Li et al. |
| 2020/0266511 A1 | 8/2020 | Kong et al. |
| 2021/0167497 A1 | 6/2021 | Wu et al. |

FOREIGN PATENT DOCUMENTS

| | | |
|---|---|---|
| CN | 109932845 | 6/2019 |
| CN | 110518311 | 11/2019 |
| CN | 112505971 | 3/2021 |
| CN | 112909454 | 6/2021 |
| CN | 110137636 | 8/2021 |
| EP | 3745526 | 12/2020 |

ELECTROMAGNETIC WAVE TRANSMISSION STRUCTURE

CROSS REFERENCE TO RELATED APPLICATION

This application is a continuation-in-part application of and claims the priority benefit of U.S. application Ser. No. 17/159,294, filed on Jan. 27, 2021, now pending, which claims the priority benefit of Taiwan application serial no. 109128106, filed on Aug. 18, 2020. This application also claims the priority benefit of U.S. provisional application Ser. No. 63/241,503, filed on Sep. 7, 2021, U.S. provisional application Ser. No. 63/254,537, filed on Oct. 12, 2021, and Taiwan application serial no. 110148503, filed on Dec. 23, 2021. The entirety of each of the above-mentioned patent applications is hereby incorporated by reference herein and made a part of specification.

BACKGROUND

Technical Field

The disclosure relates to an electromagnetic wave transmission structure, and in particular, to an electromagnetic wave transmission structure configured to guide an RF signal or a millimeter wave signal.

Description of Related Art

In the field of mobile communication, how to reduce the energy loss of electromagnetic waves in the transmission path has always been an important topic. The energy loss due to the electromagnetic waves encountering obstacles, such as concrete walls, trees, furniture, signboards, etc., will also become more significant as the frequency of the electromagnetic waves increase. Therefore, dead spots, dark areas, or areas with weak signals are readily generated in the application space. Although the issue may be relieved by adding base stations or boosters, the cost of construction, energy consumption, or subsequent hardware maintenance is considerable.

SUMMARY OF THE DISCLOSURE

The disclosure provides an electromagnetic wave transmission structure suitable for improving the energy loss of an electromagnetic wave caused by the blocking of an obstacle, and the receiving and emitting directions of an electromagnetic wave at the receiving end and the emitting end thereof are adjustable.

An electromagnetic wave transmission structure of the disclosure includes a substrate, at least one transmission line, a plurality of antennas, and a plurality of tunable dielectric units. The at least one transmission line is disposed on the substrate. The transmission line includes a first extending portion and a plurality of second extending portions. The first extending portion is extended in a first direction. The second extending portions are respectively extended from two opposite edges of the first extending portion, and an extending direction thereof is parallel to a second direction. The second extending portions are arranged at a pitch P along the first direction, wherein any two adjacent ones arranged along the first direction have a spacing S. Each of the second extending portions has a length L along the second direction. The plurality of antennas are disposed on the substrate and adjacent to the at least one transmission line. The plurality of tunable dielectric units are overlapped with a plurality of portions of the at least one transmission line located between the antennas. Each of the tunable dielectric units has a first electrode layer and a controllable dielectric layer overlapped with each other. The controllable dielectric layer is disposed between the first electrode layer and the at least one transmission line. The pitch P, the spacing S, and the length L of the transmission line satisfy the following relationship:

$$\left(\frac{S}{P}\right)^2 = \left[\left(\frac{ck_{sspp}}{\omega\sqrt{\varepsilon_r}}\right)^2 - 1\right]\cot^2\left(2L\sqrt{\varepsilon_r}\,\frac{\omega}{c}\right),$$

wherein $k_{sspp}$ is a wavenumber of an electromagnetic wave signal transmitted via the at least one transmission line, $\varepsilon_r$ is an effective dielectric constant of the controllable dielectric layer, $\omega$ is an angular frequency of the electromagnetic wave signal transmitted via the at least one transmission line, and c is a speed of light.

Based on the above, in the electromagnetic wave transmission structure of an embodiment of the disclosure, a plurality of antennas are provided adjacent to the transmission line, and a plurality of tunable dielectric units are provided at a plurality of portions of the transmission line between the antennas. The phase of the electromagnetic wave signal may be changed by electronically modulating the effective dielectric constant of the controllable dielectric layer overlapped with the transmission line in the tunable dielectric units, thereby modulating the electromagnetic wave emitting and receiving directions of the antennas.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
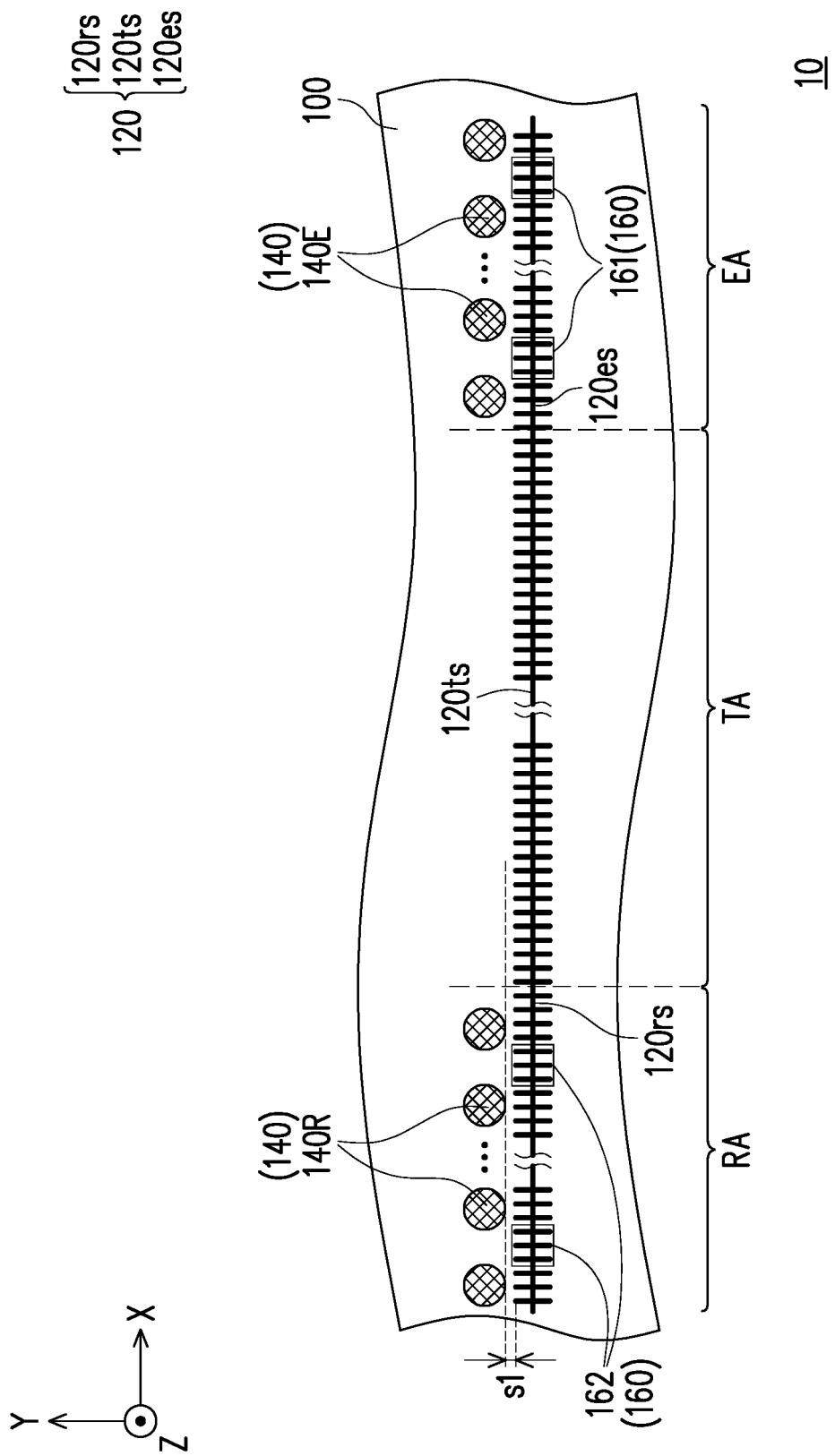
FIG. 1 is a schematic top view of an electromagnetic wave transmission structure of the first embodiment of the disclosure.

"About", "similar", "essentially", or "substantially" used in the present specification include the value and the average value within an acceptable deviation range of a specific value confirmed by those having ordinary skill in the art, and the concerned measurement and a specific quantity (i.e., limitations of the measuring system) of measurement-related errors are taken into consideration. For example, "about" may represent within one or a plurality of standard deviations of the value, or, for instance, within ±30%, ±20%, ±15%, ±10%, or ±5%. Moreover, "about", "similar", "essentially", or "substantially" used in the present specification may include a more acceptable deviation range or standard deviation according to measurement properties, cutting properties, or other properties, and one standard deviation does not need to apply to all of the properties.

In the figures, for clarity, the thicknesses of, for instance, layers, films, panels, and regions are enlarged. It should be understood that, when a layer, film, region, or an element of a substrate is "on" another element or "connected to" another element, the element may be directly on the other element or connected to the other element, or an intermediate element may also be present. On the other hand, when an element is "directly on another element" or "directly connected to" another element, an intermediate element is not present. As used in the present specification, "connected to" may refer to a physical and/or electrical connection. Furthermore, "electrically connected" may mean that other elements are present between two elements.

Hereinafter, exemplary embodiments of the disclosure are described in detail, and examples of the exemplary embodiments are conveyed via the figures. Wherever possible, the same reference numerals are used in the figures and the descriptions to refer to the same or similar portions.

Figure 2A:
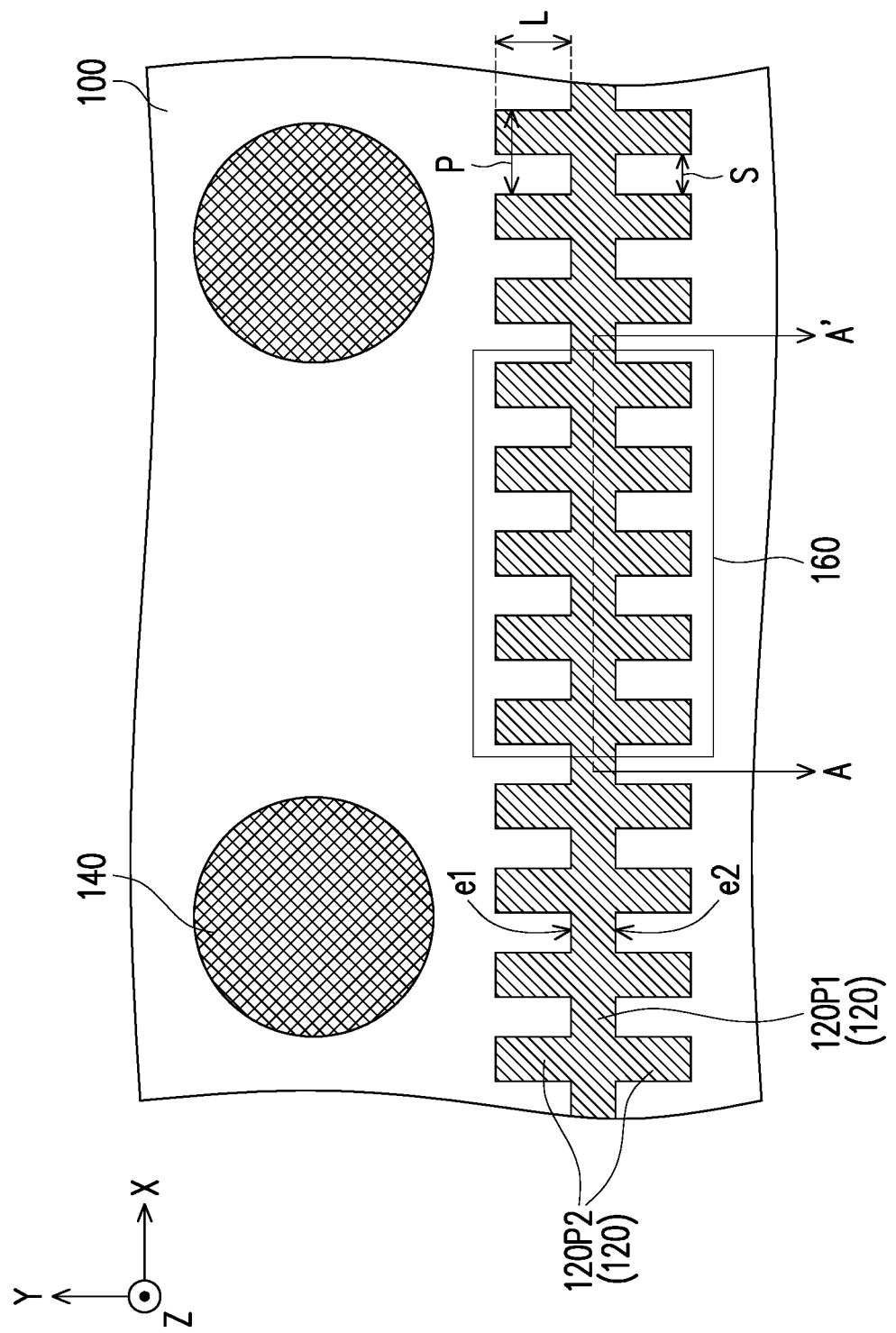
FIG. 2A is an enlarged schematic view of a partial region of the electromagnetic wave transmission structure of FIG. 1.
Figure 2B:
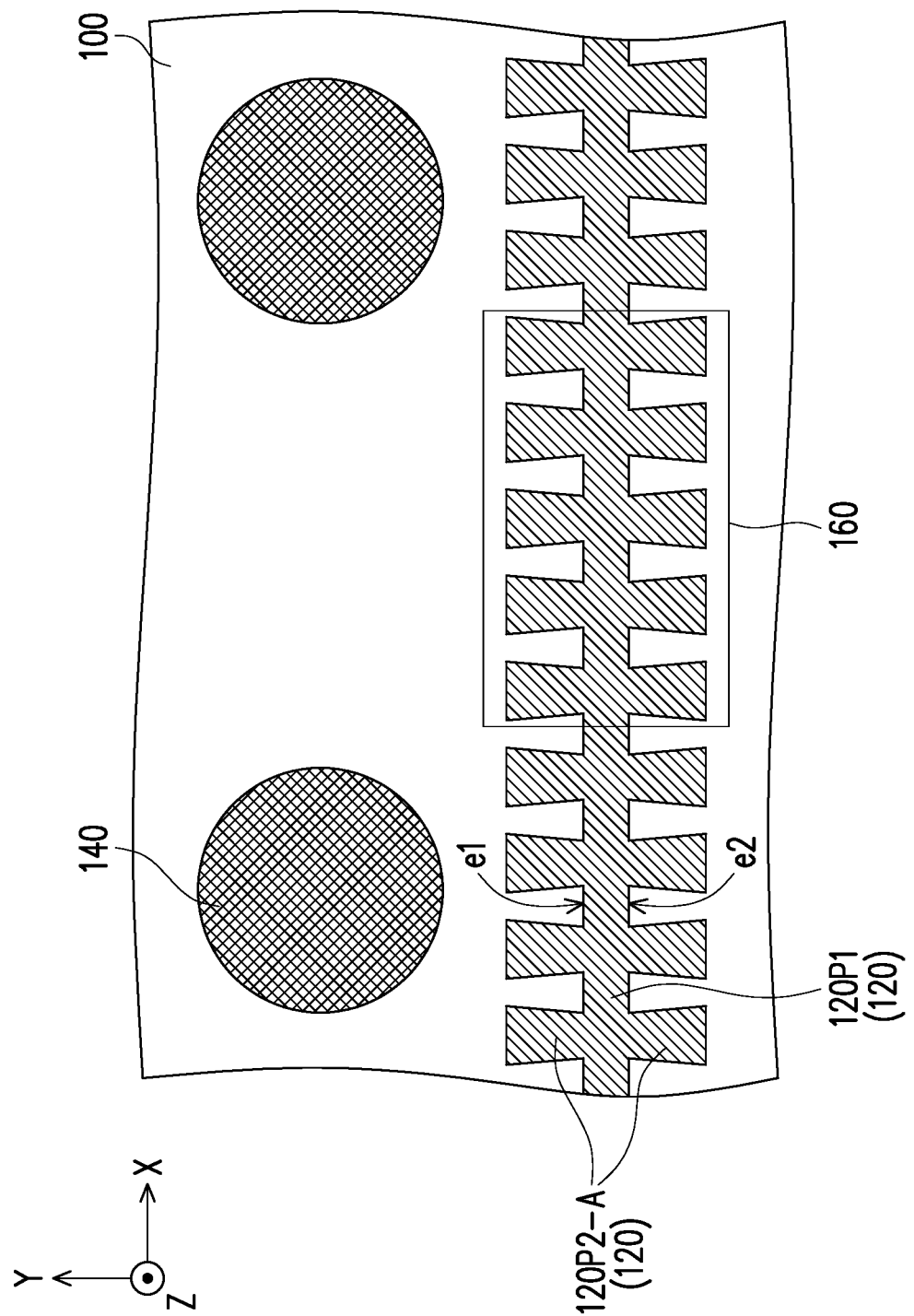
FIG. 2B is a schematic top view of another modified embodiment of the transmission line of FIG. 2A.
Figure 3A:
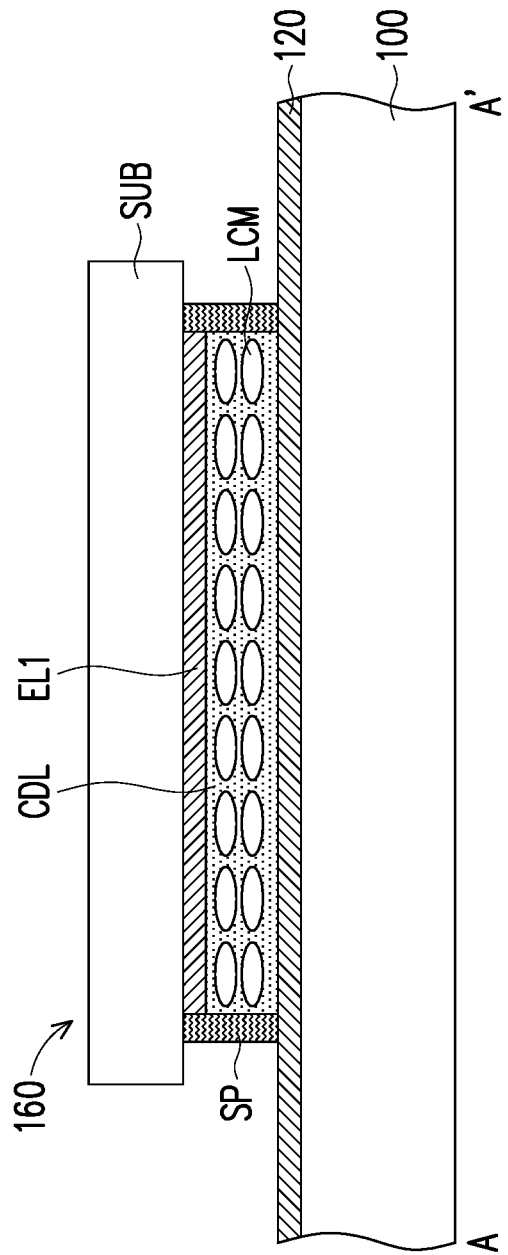
FIG. 3A and FIG. 3B are schematic cross-sectional views of the tunable dielectric units of FIG. 2A operated in different states.
Figure 3B:
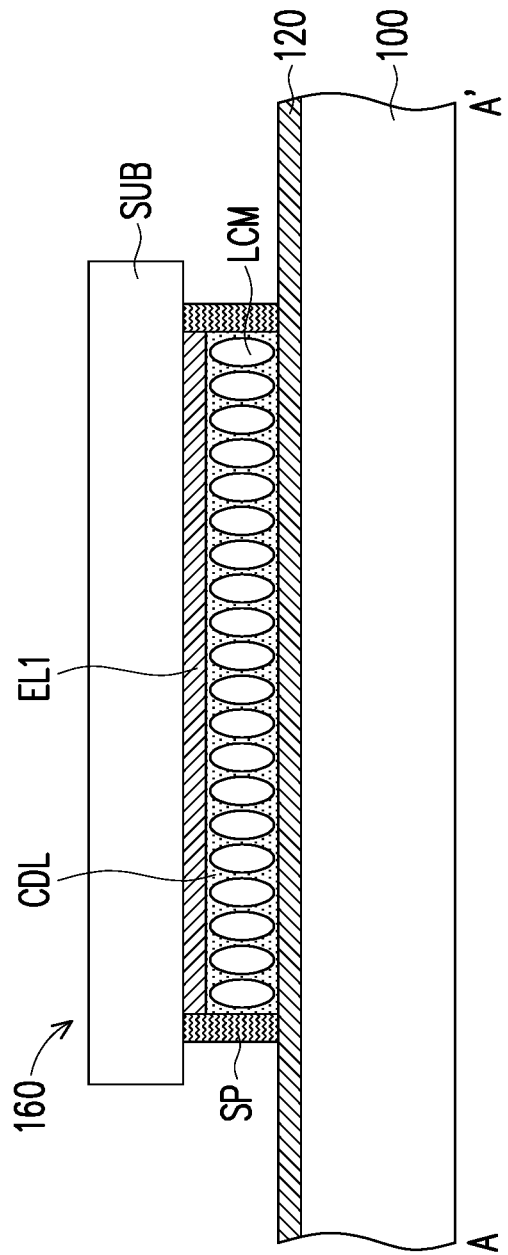
Figure 4A:
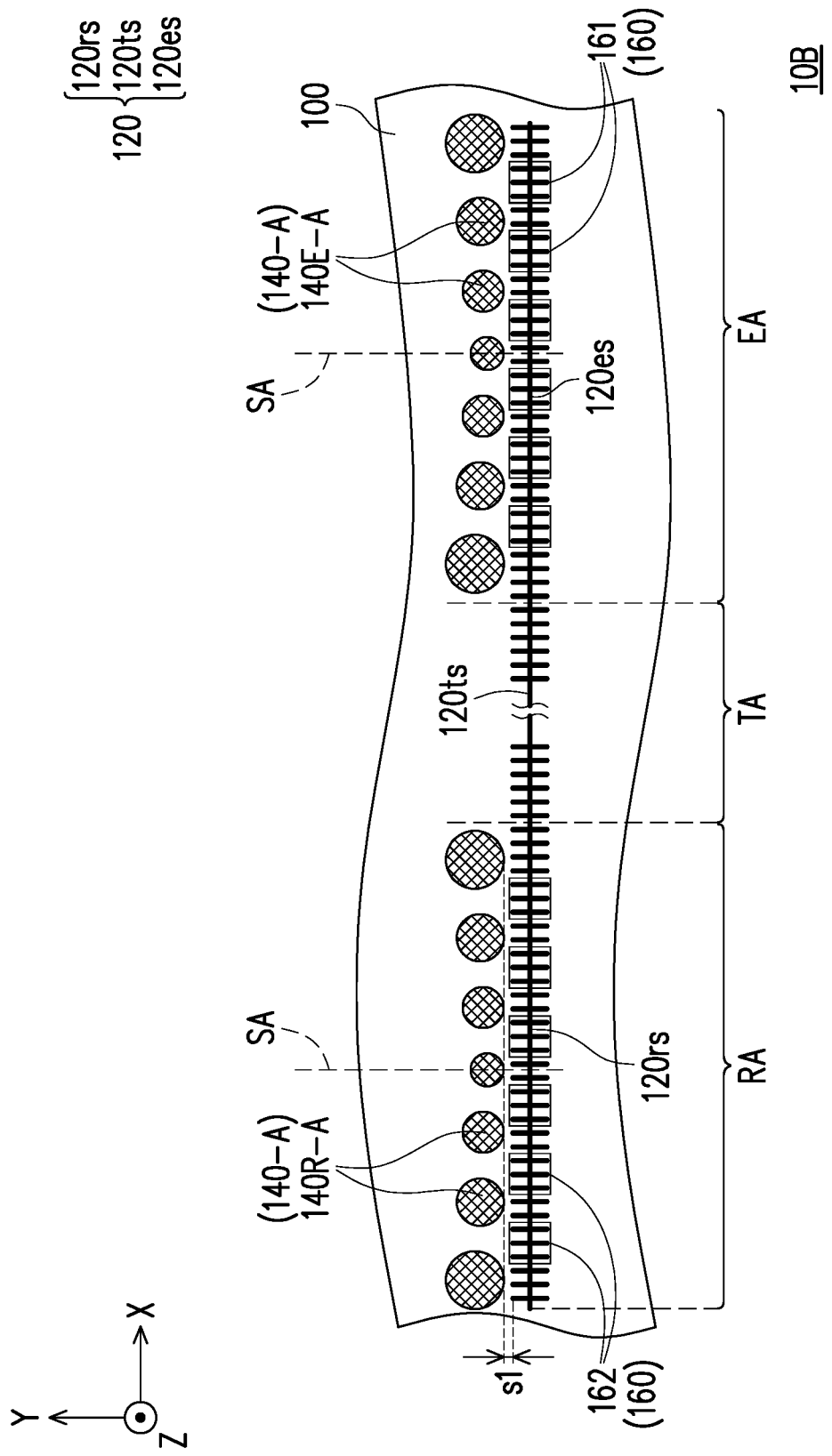
FIG. 4A to FIG. 4C are schematic top views of some other modified embodiments of the electromagnetic wave transmission structure of FIG. 1.
Figure 4B:
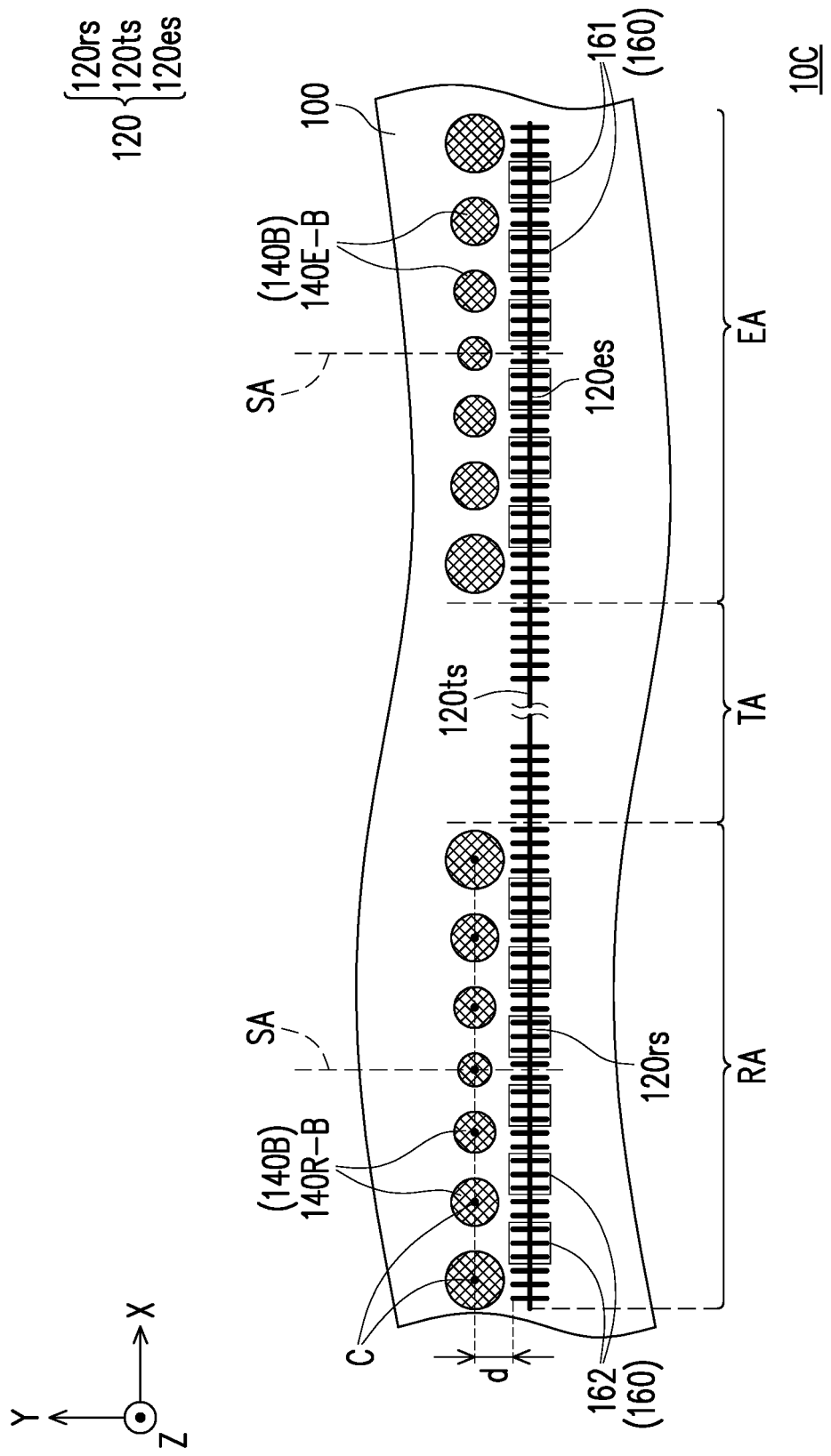
Figure 4C:
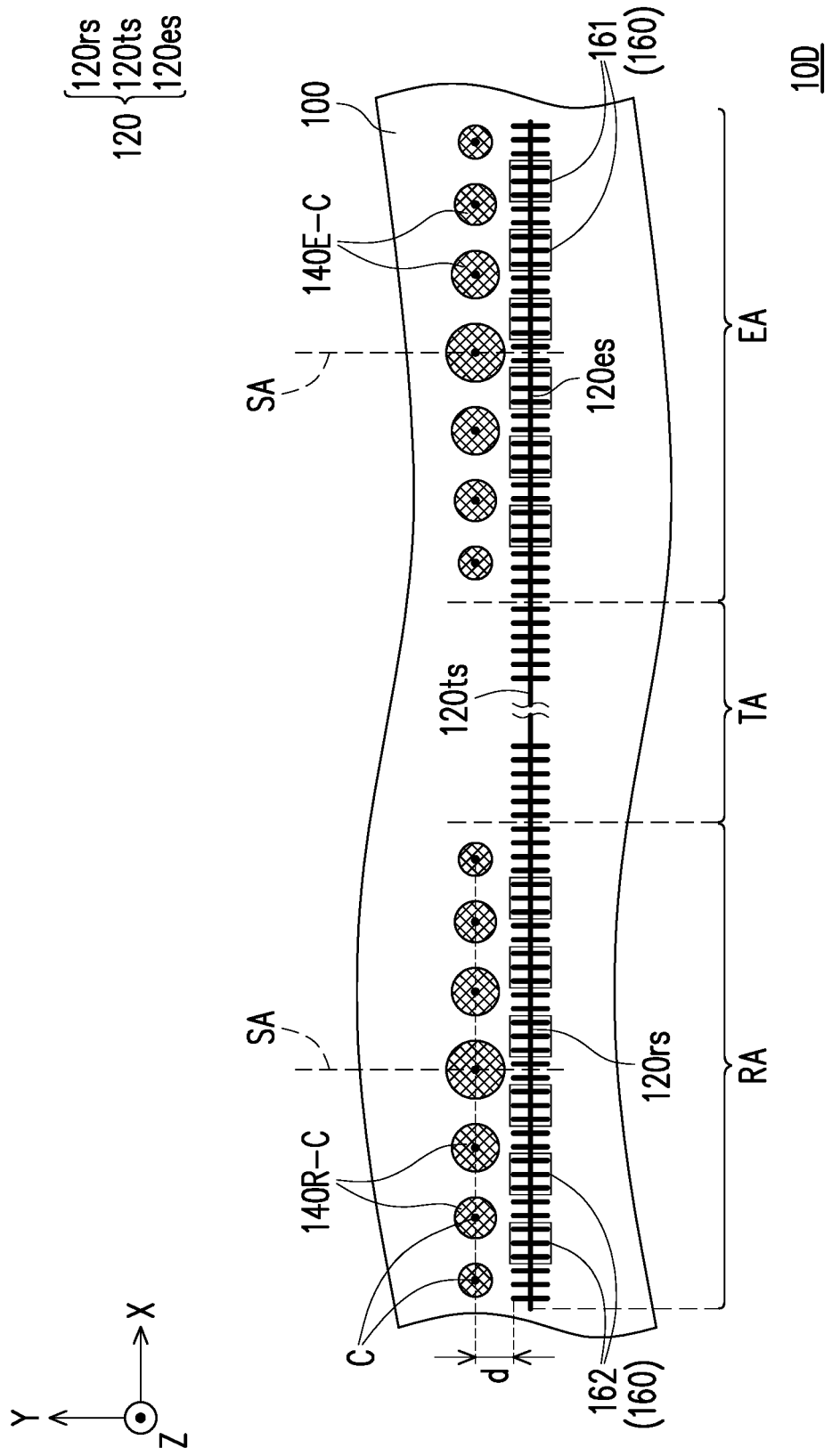

FIG. 1 is a schematic top view of an electromagnetic wave transmission structure of the first embodiment of the disclosure. FIG. 2A is an enlarged schematic view of a partial region of the electromagnetic wave transmission structure of FIG. 1. FIG. 2B is a schematic top view of another modified embodiment of the transmission line of FIG. 2A. FIG. 3A and FIG. 3B are schematic cross-sectional views of the tunable dielectric units of FIG. 2A operated in different states. FIG. 4A to FIG. 4C are schematic top views of some other modified embodiments of the electromagnetic wave transmission structure of FIG. 1. FIG. 3A and FIG. 3B correspond to the section line A-A' of FIG. 2A.

Referring to FIG. 1 and FIG. 2, an electromagnetic wave transmission structure 10 includes a substrate 100 and a transmission line 120 and a plurality of antennas 140 disposed on the substrate 100. The substrate 100 is, for example, a glass substrate, a ceramic laminate, or a low dielectric loss substrate (e.g., a Rogers substrate), but the disclosure is not limited thereto. In the present embodiment, the transmission line 120 includes a first extending portion 120P1 and a plurality of second extending portions 120P2. The second extending portions 120P2 are extended from two opposite edges e1 and e2 of the first extending portion 120P1, respectively.

For example, the first extending portion 120P1 and the second extending portion 120P2 may be extended in a direction X and a direction Y, respectively, and the direction X may be optionally perpendicular to the direction Y, but the disclosure is not limited thereto. In the present embodiment, the orthographic profile of the second extending portions 120P2 on the substrate 100 may be a rectangle. That is, the extending directions of the two edges of the second extending portions 120P2 arranged in the direction X and opposite to each other are parallel to each other and parallel to the direction Y, but the disclosure is not limited thereto. In other embodiments, the orthographic profile of the second extending portions 120P2-A of a transmission line 120A on the substrate 100 may also be a trapezoid (as shown in an electromagnetic wave transmission structure 10A shown in FIG. 2B). More specifically, the extending directions of the two edges of the second extending portions 120P2-A arranged in the direction X and opposite to each other may also not be parallel to the direction Y, that is, not perpendicular to the two edges e1 and e2 of the first extending portion 120P1.

In the present embodiment, the electromagnetic wave transmission structure 10 has a receiving area RA, a transmitting area TA, and an emitting area EA, and is suitable for being mounted on an obstacle (such as a concrete wall or a building pillar) that readily causes energy loss of an electromagnetic wave. For example, the obstacle (not shown) has a front surface facing the electromagnetic wave source and a back surface facing away from the electromagnetic wave source. The electromagnetic wave transmission structure 10 may be disposed on the obstacle and detour from the front surface of the obstacle to the back surface of the obstacle. In particular, the receiving area RA and the emitting area EA of the electromagnetic wave transmission structure 10 are respectively disposed on the front surface and the back surface of the obstacle, and the transmitting area TA may be extended on other planes connecting the front surface and the back surface of the obstacle.

The transmission line 120 may be divided into a receiving section 120rs extended in the receiving area RA, a transmitting section 120ts extended in the transmitting area TA, and an emitting section 120es extended in the emitting area EA, wherein the transmitting section 120ts is connected between the receiving section 120rs and the emitting section 120es. In the present embodiment, the antennas 140 are, for example, patch antennas. A portion of the antennas 140 may be disposed in the receiving area RA as receiving antennas 140R, and another portion of the antennas 140 may be disposed in the emitting area EA as emitting antennas 140E. For example, the electromagnetic wave transmitted toward the front surface of the obstacle may be fed into the transmission line 120 via the receiving antennas 140R in the receiving area RA of the electromagnetic wave transmission structure 10, and transmitted via the transmitting section 120ts of the transmission line 120 to enter the emitting area EA located at the back surface of the obstacle. The electromagnetic wave signal transmitted to the emitting area EA may be coupled to and radiated via the emitting antennas 140E.

In other words, when there is an obstacle that consumes electromagnetic wave energy in the transmission space of the electromagnetic wave, the electromagnetic wave transmission structure 10 of the present embodiment may be mounted on the obstacle to serve as a detour structure for the electromagnetic wave. The electromagnetic wave sent toward the obstacle would be guided by the proposed structure 10 rather than directly passing through the obstacle. Therefore, the energy loss when the electromagnetic wave passes through the obstacle via this detour structure is much less compared with directly passing through the obstacle.

More specifically, the plurality of receiving antennas 140R located in the receiving area RA may be adjacent to a side of the receiving section 120rs of the transmission line 120 and arranged to form a one-dimensional receiving antenna along the extending direction (e.g., the direction X) of the first extending portion 120P1 of the transmission line 120. Similarly, the plurality of emitting antennas 140E located in the emitting area EA are adjacent to a side of the emitting section 120es of the transmission line 120, and are arranged in a one-dimensional emitting antenna array along the extending direction of the first extending portion 120P1 of the transmission line 120. Although the receiving antennas 140R and the emitting antennas 140E shown in FIG. 1 are located at the same side of the transmission line 120, the disclosure is not limited thereto. In other embodiments, the receiving antennas 140R and the emitting antennas 140E may also be disposed at two opposite sides of the transmission line 120 respectively, or the receiving antennas 140R (or the emitting antennas 140E) are adjacent to both the two opposite sides of the transmission line 120.

In order to modify the receiving and emitting directions of an electromagnetic wave of the antenna array consisting of the plurality of antennas 140, the electromagnetic wave transmission structure 10 further includes a plurality of tunable dielectric units 160. It should be mentioned that the tunable dielectric units 160 are overlapped with the transmission line 120 along the direction perpendicular to the substrate 100 (e.g., a direction Z). In the present embodiment, the tunable dielectric units 160 may be disposed in the emitting area EA and the receiving area RA, respectively. For example, the emitting area EA may be provided with a plurality of tunable dielectric units 161, and the receiving area RA may be provided with a plurality of tunable dielectric units 162.

The tunable dielectric units 161 are respectively overlapped with a plurality of portions (or sections) of the emitting section 120es of the transmission line 120 located between the plurality of emitting antennas 140E along the direction Z. Similarly, the tunable dielectric units 162 are respectively overlapped with a plurality of portions (or sections) of the receiving section 120rs of the transmission line 120 located between the plurality of receiving antennas 140R along the direction Z. In other words, the emitting antennas 140E adjacent to the emitting section 120es and the tunable dielectric units 161 are alternately arranged along the extending direction of the transmission line 120 (for example, the direction X), and the receiving antennas 140R adjacent to the receiving section 120rs and the tunable dielectric units 162 are alternately arranged along the extending direction of the transmission line 120.

Please refer to FIG. 3A and FIG. 3B at the same time, in the present embodiment, the tunable dielectric units 160 have a first electrode layer EL1 and a controllable dielectric layer CDL overlapped in the direction Z, and the controllable dielectric layer CDL is disposed between the first electrode layer EL1 and the transmission line 120. In particular, the controllable dielectric layer CDL is, for example, a liquid-crystal layer, and the electric field generated by the potential difference between the first electrode layer EL1 and the transmission line 120 is suitable for driving a plurality of liquid-crystal molecules LCM of the liquid-crystal layer to rotate. For example, the first electrode layer EL1 may be disposed on another substrate SUB, and a spacer SP is sandwiched between the substrate SUB and the substrate 100 to form an accommodating space of the controllable dielectric layer CDL.

Further, the plurality of second extending portions 120P2 of the transmission line 120 are arranged at two opposite sides of the first extending portion 120P1 along the direction X at a pitch P. Any two adjacent ones of the second extending portions 120P2 arranged along the direction X have a spacing S, and each of them has a length L along the direction Y. Specifically, the structural dimensions of the transmission line 120 satisfy the following relationship:

$$\left(\frac{S}{P}\right)^2 = \left[\left(\frac{ck_{sspp}}{\omega\sqrt{\varepsilon_r}}\right)^2 - 1\right]\cot^2\left(2L\sqrt{\varepsilon_r}\frac{\omega}{c}\right),$$

wherein $k_{sspp}$ is the wavenumber of an electromagnetic wave signal transmitted via the transmission line 120, $\varepsilon_r$ is the effective dielectric constant of the controllable dielectric layer CDL, $\omega$ is the angular frequency of the electromagnetic wave signal transmitted via the transmission line, and c is the speed of light.

Since the liquid-crystal material used as the controllable dielectric layer CDL in the present embodiment has dielectric anisotropy, that is, the liquid-crystal material respectively has different dielectric constants (for example: a dielectric constant $\varepsilon_{//}$ and a dielectric constant $\varepsilon^{\perp}$) in the directions parallel and perpendicular to the long axis of the liquid-crystal molecules, the liquid-crystal material is electrically controllable. In other words, by applying an electric field to the liquid-crystal layer, the effective dielectric constant of the liquid-crystal layer in a specific direction may be changed, and the effective dielectric constant falls within the range between the dielectric constant $\varepsilon_{//}$ and the dielectric constant $\varepsilon^{\perp}$.

For example, in the present embodiment, the controllable dielectric layer CDL may adopt the liquid-crystal material K15 (Merck KGaA) with the dielectric constant $\varepsilon_{//}$ and the dielectric constant $\varepsilon^{\perp}$ of 2.9 and 2.72, respectively, and an alignment material layer with horizontal alignment capability (for example: a polyimide thin-film brushed with fluff) is adopted to align the liquid-crystal molecules LCM. In particular, the alignment material layer may be disposed at the interface of the liquid-crystal layer and the first electrode layer EL1 and/or at the interface of the liquid-crystal layer and the substrate 100. However, the disclosure is not limited thereto. In other embodiments, the selection of the liquid-crystal material and the alignment manner thereof may be adjusted according to different application requirements.

In the present embodiment, when the liquid-crystal layer is in a state where no electric field is applied, the liquid-crystal molecules LCM thereof are arranged parallel to the substrate 100 (as shown in FIG. 3A). At this time, the effective dielectric constant of the controllable dielectric layer CDL to the electromagnetic wave signal transmitted on the transmission line 120 is the larger dielectric constant $\varepsilon_{//}$, so that the equivalent electromagnetic wave wavelength is smaller and the wavenumber is larger. Therefore, the controllable dielectric layer CDL to which the electric field is not applied may generate more phase shifts in the X-axis direction than a state in which the electric field is applied, as described later.

When an electric field is applied to the liquid-crystal layer, that is, when there is a potential difference between the first electrode layer EL1 and the transmission line 120, since the liquid-crystal material K15 has a larger dielectric constant in the direction of the long molecular axis, the long molecular axis thereof tends to align along the direction of the electric field. In the present embodiment, the direction of the electric field formed in the overlap region of the first electrode layer EL1 and the transmission line 120 is substantially perpendicular to the substrate 100. When the electric field strength is large enough, the long axis direction of most of the liquid-crystal molecules located in the overlap region is also substantially perpendicular to the substrate 100 (as shown in FIG. 3B). At this time, the effective dielectric constant of the controllable dielectric layer CDL to the electromagnetic wave signal transmitted on the transmission line 120 is the smaller dielectric constant $\varepsilon^{\perp}$. Therefore, when an electric field is applied to the liquid-crystal layer (i.e., the controllable dielectric layer CDL), less phase shift may be generated in the X-axis direction compared to the above state in which the electric field is not applied.

Therefore, by changing the arrangement direction of the liquid-crystal molecules LCM by the presence or absence of an applied electric field or an applied electric field of different magnitudes, the effective dielectric constant of the controllable dielectric layer CDL in the direction of the electric field of the electromagnetic wave signal may be changed, thereby changing the phase of the electromagnetic wave signal transmitted on the transmission line 120.

In the present embodiment, the tunable dielectric units 160 are provided in the portion between the receiving section 120rs and the emitting section 120es of the transmission line 120 between any two adjacent antennas 140, and via the phase modulation capability of the tunable dielectric units 160, the electromagnetic wave receiving and emitting directions of the plurality of antennas 140 of the one-dimensional antenna array arranged along one side of the transmission line 120 may be changed, wherein the adjustment of the electromagnetic wave receiving and emitting directions is, for example, in the dimension of the XZ plane.

For example, the plurality of tunable dielectric units 161 located in the emitting area EA are suitable for adjusting the phase of the electromagnetic wave signal transmitted in the emitting section 120es of the transmission line 120. Therefore, the electromagnetic wave signal coupled and radiated by the plurality of emitting antennas 140E from the transmission line 120 has different phase combinations according to the different phase shifts imparted by each of the tunable dielectric units 161, thereby changing the transmission direction of the electromagnetic wave on the XZ plane. Moreover, when the electromagnetic wave is received by the receiving antennas 140R and fed into the receiving section 120rs of the transmission line 120, the plurality of tunable dielectric units 162 located in the receiving area RA are suitable for adjusting the phase of the electromagnetic wave signal fed into the transmission line 120 at different delay times, which is equivalent to adjusting the receiving field pattern of the receiving section 120rs on the XZ plane.

Further, the orthographic profile of the antennas 140 of the present embodiment on the substrate 100 is, for example, a circle, and the size (e.g., diameter) of each of the antennas 140 is substantially the same. In the present embodiment, a spacing s1 between each of the antennas 140 and the adjacent transmission line 120 is also substantially the same. Therefore, each of the antennas 140 has a similar degree of energy coupling with the transmission line 120. For example, the energy difference of the electromagnetic wave fed into the transmission line 120 via each of the receiving antennas 140R is not large, and the power radiated by the electromagnetic wave signal via each of the emitting antennas 140E is also similar. As a result, the beam width/half power beam width (HPBW) of the main lobe of the electromagnetic wave radiated by the emitting antenna array is narrower, and the radiated power difference between the side lobe and the main lobe is also smaller.

However, the disclosure is not limited thereto. In other modified embodiments, the plurality of antennas forming the antenna array may also have different sizes, and the distances between the antennas and the transmission line may also be different. Referring to FIG. 4A, in a modified embodiment, the plurality of antennas 140A (e.g., receiving antennas 140R-A and emitting antennas 140E-A) of an electromagnetic wave transmission structure 10B may have different sizes. In detail, the plurality of receiving antennas 140R-A have a symmetry axis SA, and the diameter (or circular diameter) of each of the receiving antennas 140R-A is increased away from the symmetry axis SA. The plurality of emitting antennas 140E-A are also configured in the same manner.

For example, the antennas 140A located on the symmetry axis SA have the best reception/radiation efficiency for an electromagnetic wave of a specific frequency (that is, the resonance frequency of the central antenna is the carrier frequency of the pre-transceived signal), and the reception/radiation efficiency of the antennas 140A with different sizes deviated from the symmetry axis SA for the an electromagnetic wave of a specific frequency is decreased as the size (e.g., diameter) of the antennas become larger. Via such a configuration, the HPBW of the main lobe of the electromagnetic wave radiated by the emitting antenna array may be increased, and the radiated power of the side lobe may be suppressed.

To achieve a similar effect, in another modified embodiment shown in FIG. 4B, the size configuration of the plurality of antennas 140B (e.g., receiving antennas 140R-B and emitting antennas 140E-B) of an electromagnetic wave transmission structure 10C is similar to that of the plurality of antennas 140A of FIG. 4A, but the spacings between the antennas 140B and the adjacent transmission line 120 may be different. It is particularly noted that distances d between a geometric center C of each of the antennas 140B and the adjacent transmission line 120 are all substantially the same.

Different from the embodiment of FIG. 4B, in an electromagnetic wave transmission structure 10D shown in FIG. 4C, the diameter of each of a plurality of receiving antennas 140R-C thereof is decreased away from the symmetry axis SA, and a plurality of emitting antennas 140E-C thereof are also configured in the same manner. In addition, the resonance frequency of the center antenna (the receiving antennas 140R-C and the emitting antennas 140E-C provided on the symmetry axis SA) is the carrier frequency of the pre-transmission signal. However, the disclosure is not limited thereto. In an embodiment, the configuration of the emitting antenna array and the receiving antenna array may also be optionally different.

In the following, other embodiments are provided to explain the disclosure in detail. The same components are labeled with the same reference numerals, and the description of the same technical content is omitted. For the omitted parts, please refer to the foregoing embodiments, which is not described again below.

Figure 5:
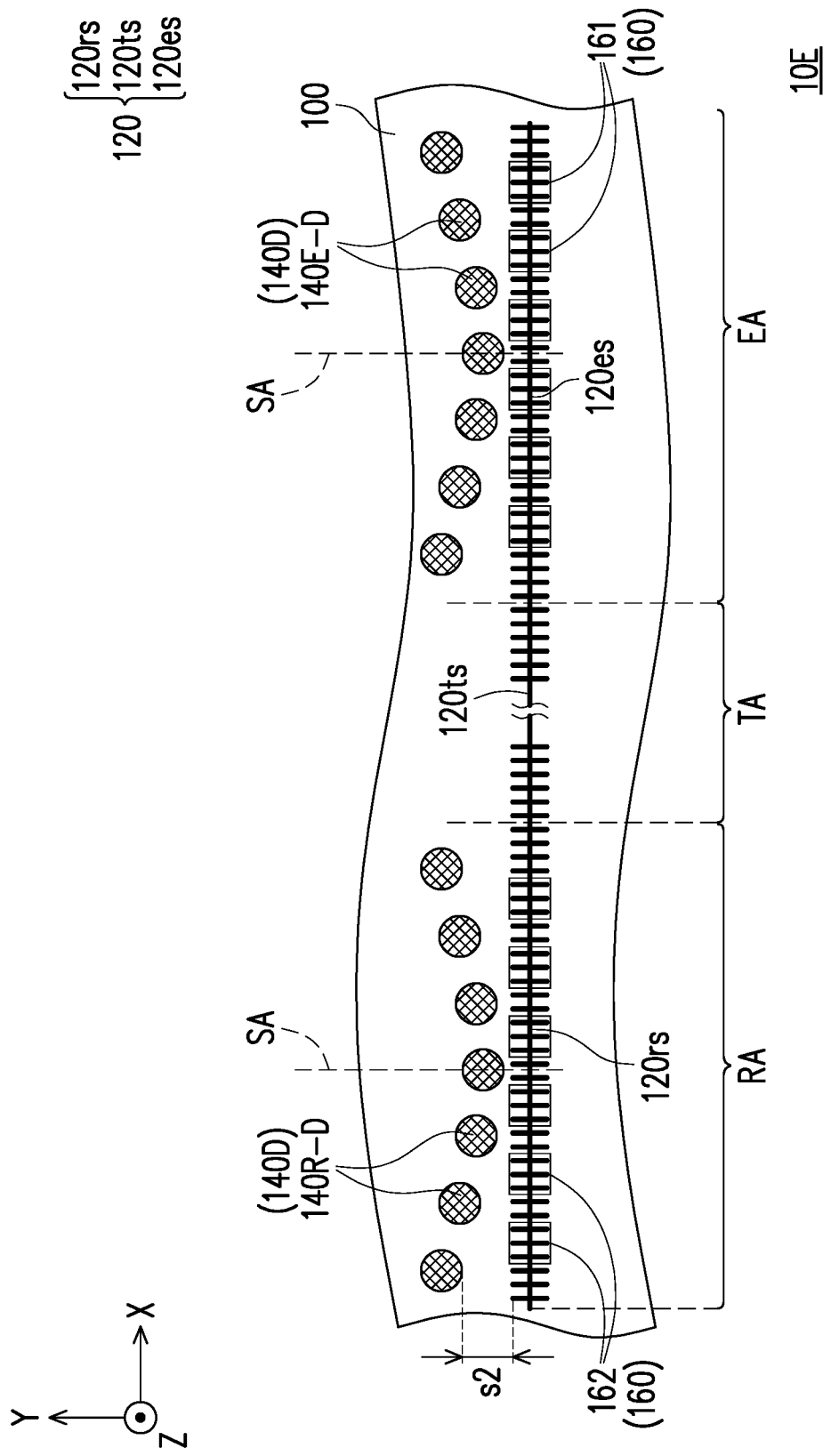
FIG. 5 is a schematic top view of an electromagnetic wave transmission structure of the second embodiment of the disclosure.

FIG. 5 is a schematic top view of an electromagnetic wave transmission structure of the second embodiment of the disclosure. Referring to FIG. 5, the difference between an electromagnetic wave transmission structure 10E of the present embodiment and the electromagnetic wave transmission structure 10 of FIG. 1 is that the configuration of the antenna array is different. In the present embodiment, the antenna array formed by a plurality of antennas 140D of the electromagnetic wave transmission structure 10E has the symmetry axis SA, and a spacing s2 between the plurality of antennas 140D of the antenna array and the transmission line 120 is increased away from the symmetry axis SA. In other words, the antennas 140D (e.g., receiving antennas 140R-D and emitting antennas 140E-D) located on symmetry axis SA have the smallest distance from transmission line 120 and thus have the greatest degree of energy coupling. Conversely, the distance between the antennas 140D located outside the antenna array and the transmission line 120 is largest, and therefore the degree of energy coupling thereof is smallest.

Therefore, the antennas 140D located on the symmetry axis SA have the best reception/radiation efficiency for an electromagnetic wave of a specific frequency, and the reception/radiation efficiency of the antennas 140D with the same size deviated from the symmetry axis SA for the electromagnetic wave of the specific frequency is decreased as the spacing s2 between the antennas 140D and the transmission line 120 is increased. For example, via such a configuration, the HPBW of the main lobe of the electromagnetic wave radiated by the emitting antenna array may be increased, and the radiated power of the side lobe may be suppressed.

Figure 6:
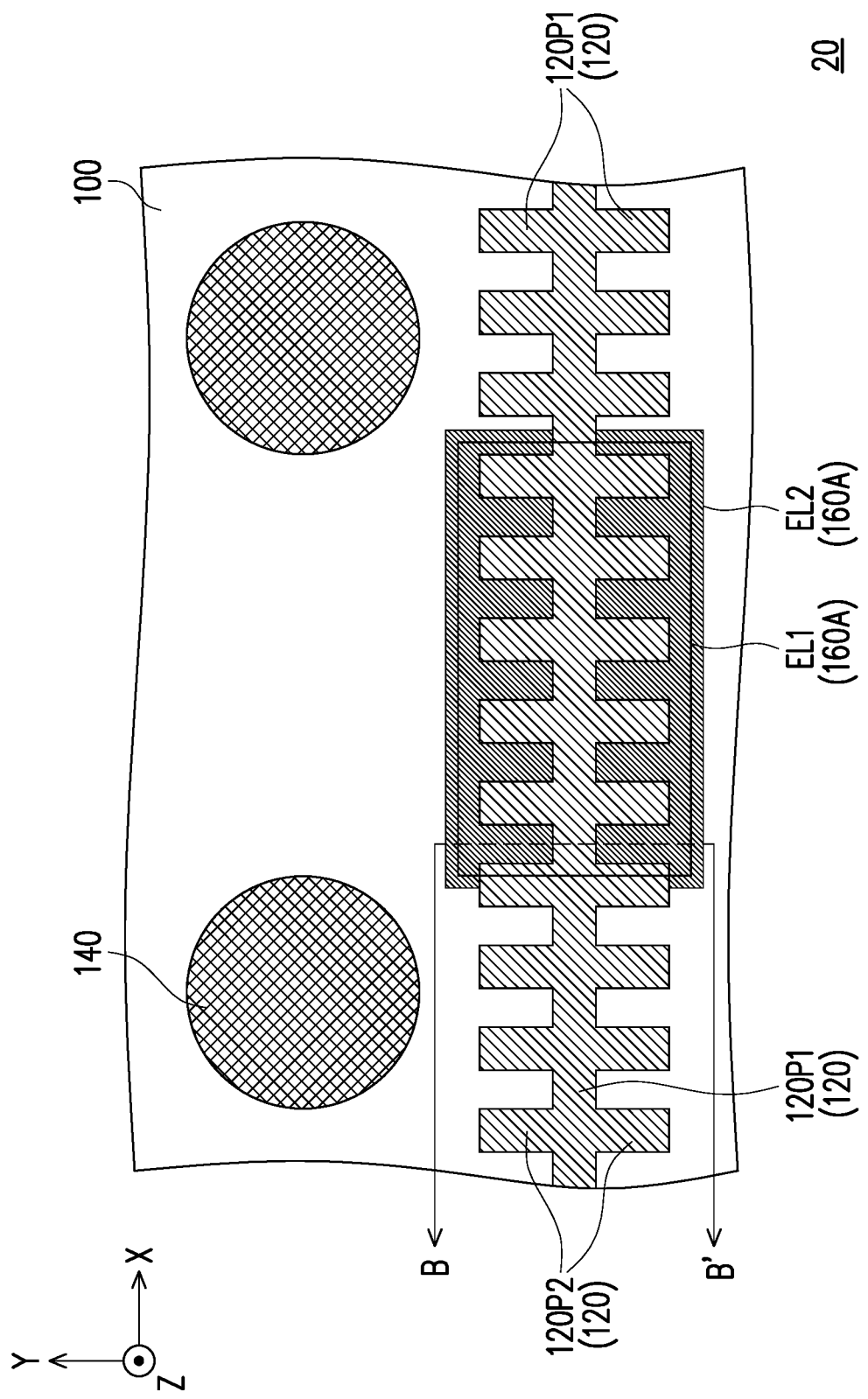
FIG. 6 is a schematic top view of an electromagnetic wave transmission structure of the third embodiment of the disclosure.
Figure 7:
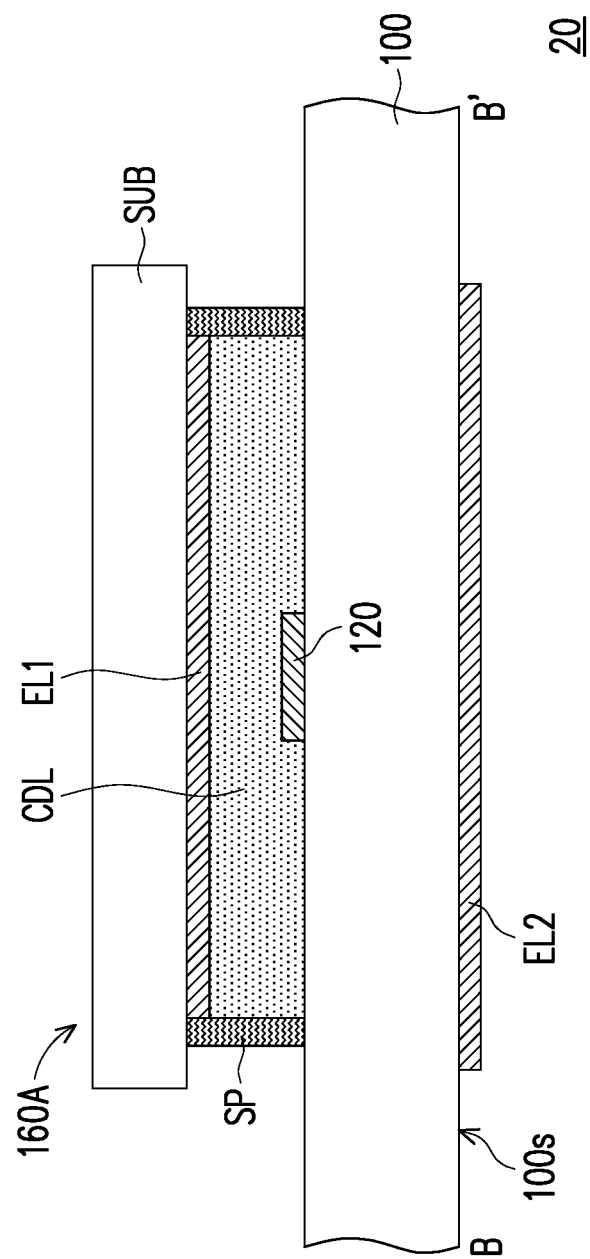
FIG. 7 is a schematic cross-sectional view of the electromagnetic wave transmission structure of FIG. 6.

FIG. 6 is a schematic top view of an electromagnetic wave transmission structure of the third embodiment of the disclosure. FIG. 7 is a schematic cross-sectional view of the electromagnetic wave transmission structure of FIG. 6 along section line B-B'. For the sake of clarity, FIG. 6 omits the illustration of the substrate SUB, the controllable dielectric layer CDL, and the spacer SP in FIG. 7. Please refer to FIG. 6 and FIG. 7, compared with the electromagnetic wave transmission structure 10 of FIG. 3A, tunable dielectric units 160A of an electromagnetic wave transmission structure 20 of the present embodiment further include a second electrode layer EL2 disposed on a side surface 100s of the substrate 100 faced away from the transmission line 120 and overlapped with the controllable dielectric layer CDL along the direction Z.

It is particularly noted that, unlike the electromagnetic wave transmission structure 10 of the above embodiments, the first electrode layer EL1 and the second electrode layer EL2 of the tunable dielectric units 160A of the present embodiment are suitable for generating an electric field configured to change the effective dielectric constant of the controllable dielectric layer CDL. That is, in the present embodiment, the transmission line 120 is not used as an electrode for driving the controllable dielectric layer CDL.

Moreover, in the present embodiment, the second electrode layer EL2, like the first electrode layer EL1, is also a patterned electrode, but the disclosure is not limited thereto. In a preferred embodiment, the second electrode layer EL2 may also be a planar electrode corresponding to a plurality of first electrode layers EL1 of the plurality of tunable dielectric units 160A. That is, the second electrode layer EL2 may be a non-patterned electrode layer comprehensively covering the surface 100s of the substrate 100.

Figure 8:
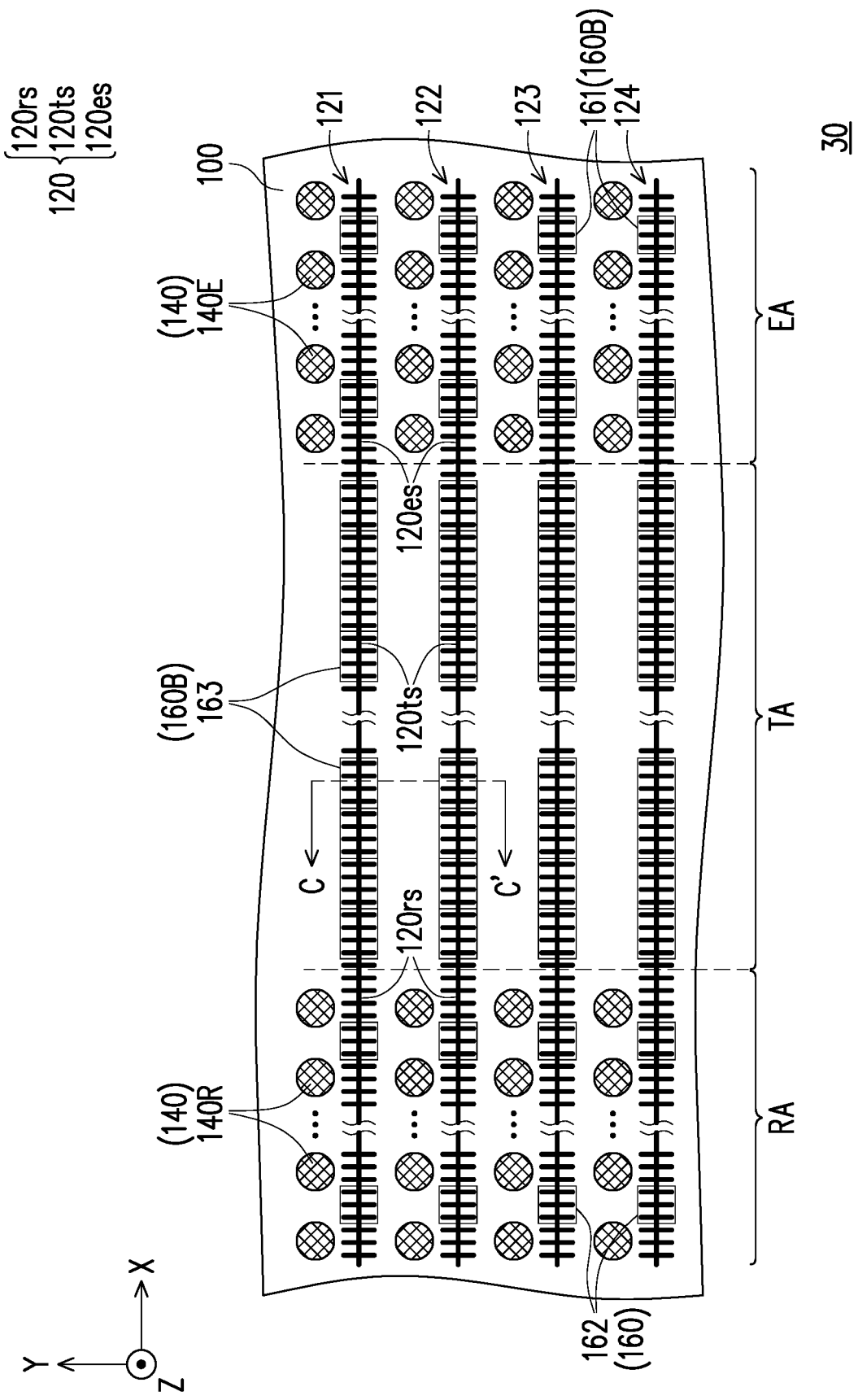
FIG. 8 is a schematic top view of an electromagnetic wave transmission structure of the fourth embodiment of the disclosure.
Figure 9:
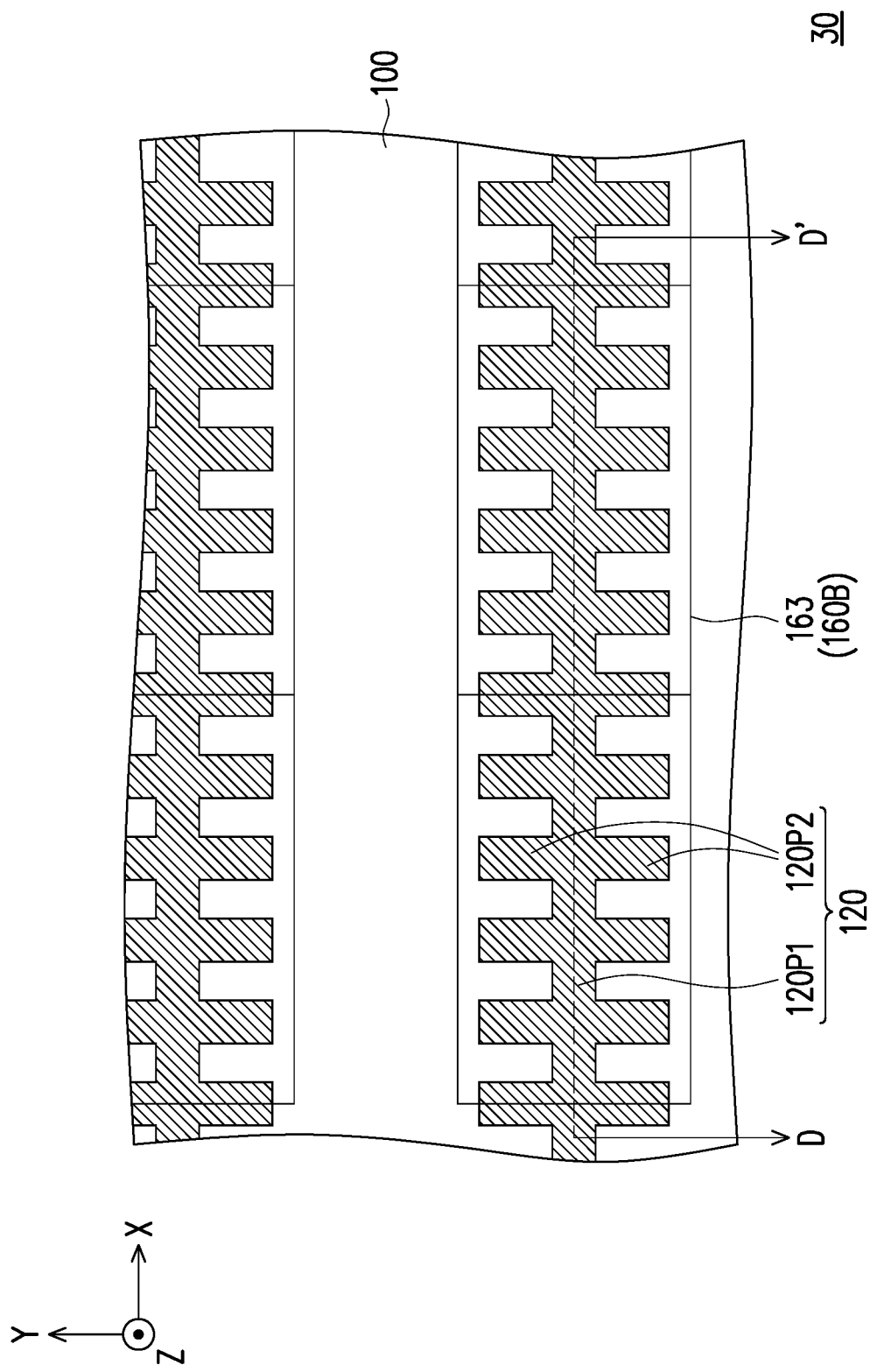
FIG. 9 is an enlarged schematic view of a partial region of the electromagnetic wave transmission structure of FIG. 8.
Figure 10:
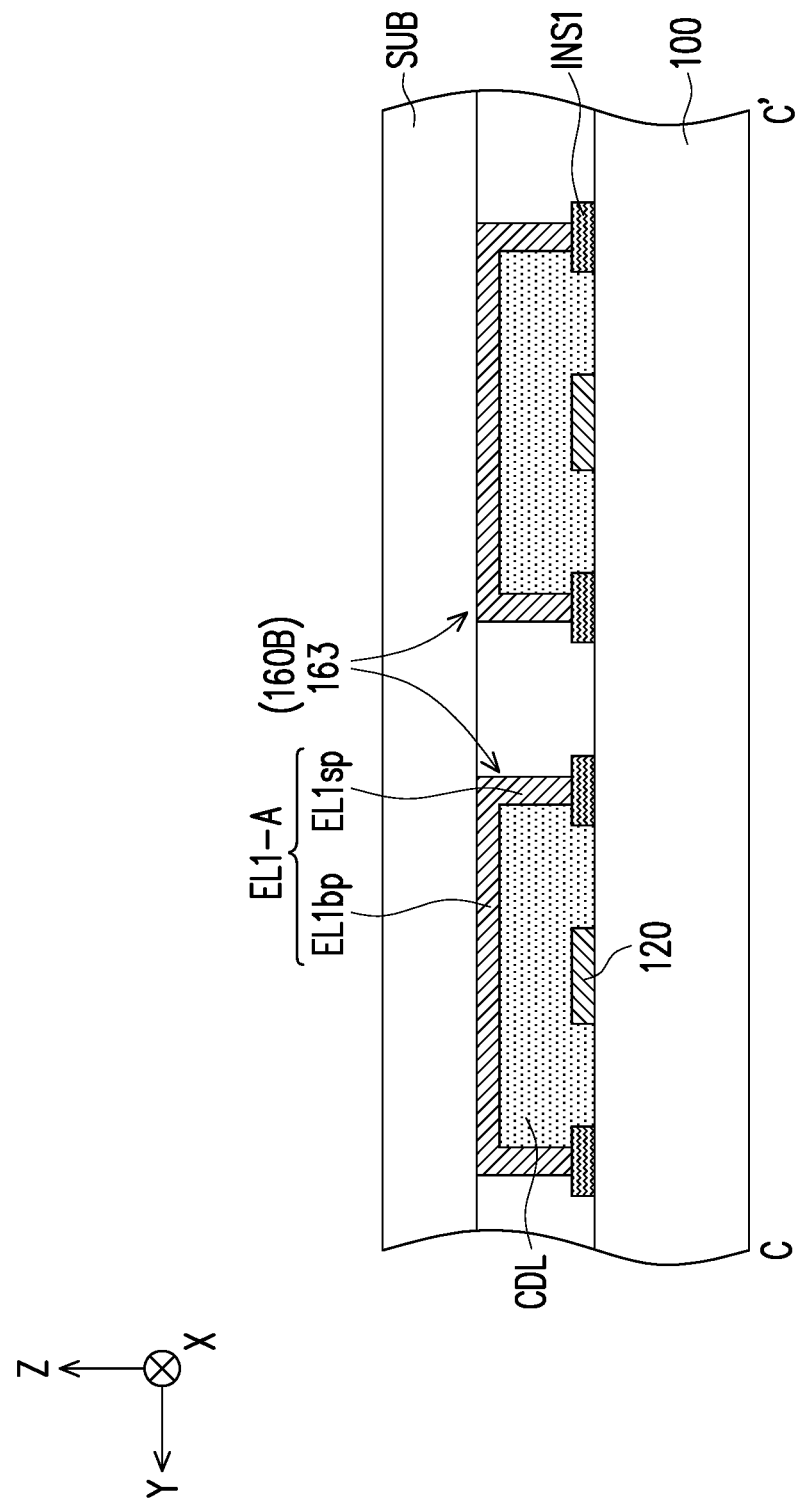
FIG. 10 is a schematic cross-sectional view of the electromagnetic wave transmission structure of FIG. 8.
Figure 11:
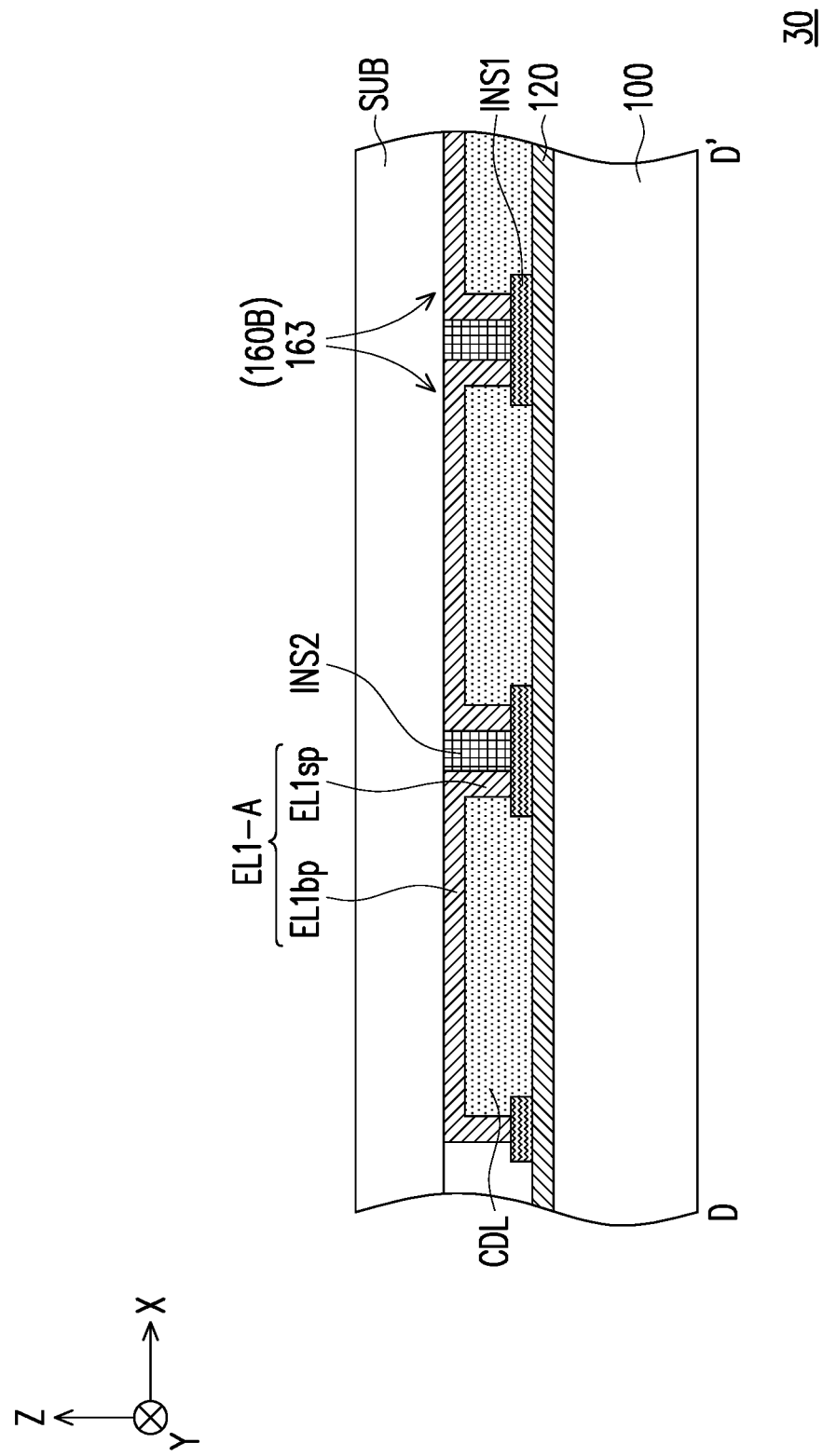
FIG. 11 is a schematic cross-sectional view of the electromagnetic wave transmission structure of FIG. 9.

FIG. 8 is a schematic top view of an electromagnetic wave transmission structure of the fourth embodiment of the disclosure. FIG. 9 is an enlarged schematic view of a partial region of the electromagnetic wave transmission structure of FIG. 8. FIG. 10 is a schematic cross-sectional view of the electromagnetic wave transmission structure of FIG. 8 along section line C-C'. FIG. 11 is a schematic cross-sectional view of the electromagnetic wave transmission structure of FIG. 9 along section line D-D'.

Referring to FIG. 8 to FIG. 11, in the present embodiment, an electromagnetic wave transmission structure 30 may include a plurality of transmission lines, such as a transmission line 121, a transmission line 122, a transmission line 123, and a transmission line 124. Since the configuration relationship and the corresponding technical effect of each of the transmission line 120, the antennas 140, the tunable the dielectric units 161, and the tunable dielectric units 162 of the present embodiment are similar to the electromagnetic wave transmission structure 10 in FIG. 1, for detailed descriptions, please refer to the relevant paragraphs of the above embodiments, which are not repeated herein.

In the present embodiment, the plurality of antennas 140 adjacent to the plurality of transmission lines 120 may be arranged in a plurality of columns and a plurality of rows along the direction X and the direction Y, respectively. For example, the plurality of receiving antennas 140R located in the receiving area RA may be arranged to form one two-dimensional receiving antenna array, and the plurality of emitting antennas 140E located in the emitting area EA may be arranged to form one two-dimensional emitting antenna array. However, the disclosure is not limited thereto. In another embodiment not shown, the plurality of antennas 140 located in the receiving area RA or the emitting area EA may also be arranged in a honeycomb-shaped two-dimensional antenna array. For example, any two adjacent ones of the plurality of one-dimensional antenna arrays arranged along the direction X of the antennas 140 may be disposed in a staggered manner in the direction Y.

It should be noted that, in addition to tunable dielectric units 160B provided in the receiving area RA and the emitting area EA, an electromagnetic wave transmission structure 30 of the present embodiment is also provided with a plurality of tunable dielectric units 163 in the transmitting area TA. The tunable dielectric units 163 are overlapped with a plurality of the transmitting section 120ts of the plurality of transmission lines 120 along the direction Z, and are arranged in a plurality of columns and a plurality of rows along the direction X and the direction Y, respectively. That is, the tunable dielectric units 163 may be arranged in an array in the transmitting area TA of the electromagnetic wave transmission structure 30. Since the detailed composition of the tunable dielectric units 163 is similar to that of the tunable dielectric units 161 and the tunable dielectric units 162, detailed descriptions are omitted.

In the present embodiment, the plurality of tunable dielectric units 163 located in the transmitting area TA and overlapped with the same transmission line 120 are disposed adjacent to each other. More specifically, there is no gap between the tunable dielectric units 163 arranged along the transmitting sections 120ts. Therefore, when the electromagnetic wave signal is transmitted on the transmission line 120, the energy attenuation caused by the discontinuity of the surrounding dielectric layer may be avoided. Moreover, when the plurality of tunable dielectric units 163 on the same transmission line 120 are driven, the effective dielectric constant of each of the controllable dielectric layers CDL thereof (as shown in FIG. 11) may be gradually changed from the direction of the receiving section 120rs to the emitting section 120es, such as: ramp up, ramp down, ramp down then ramp up, or ramp up then ramp down. In other words, the difference in dielectric constant between any two adjacent ones of the plurality of controllable dielectric layers CDL of the tunable dielectric units 163 is not too large, so as to avoid significant energy loss when the electromagnetic wave signal passes through.

For example, different voltages may be applied to a first electrode layer EL1-A of each of the tunable dielectric units 163 on the same transmission line 120, so that the rotation degrees of the plurality of liquid-crystal molecules in the liquid-crystal layer serving as the controllable dielectric layer CDL are different, and the effective dielectric constant in the direction of the electric field of the electromagnetic wave signal generates an approximate continuous change. In particular, the effective dielectric constant is, for example, between the dielectric constant $\varepsilon_\perp$ and the dielectric constant $\varepsilon_{//}$ of the liquid-crystal layer according to different applied voltages. It should be mentioned that, the approximate continuous change of the effective dielectric constant here means that the difference between the effective dielectric constants generated by any two adjacent tunable dielectric units 163 is very small, and the difference may depend on the number of the tunable dielectric units 163 on the same transmission line 120. That is to say, if there are more tunable dielectric units 163 on the same transmission line 120, the change of the effective dielectric constant on the transmission line 120 is closer to the continuous change.

It should be mentioned that, by disposing the tunable dielectric units 163 on different transmission lines 120, the phase difference between the electromagnetic wave signals transmitted on the different transmission lines 120 may be adjusted, so that the two-dimensional antenna array of the present embodiment has the capability of modulating the electromagnetic wave receiving and emitting directions on the XZ plane and the YZ plane at the same time.

For example, the tunable dielectric units 163 are suitable for adjusting the phases of a plurality of electromagnetic wave signals transmitted in a plurality of transmitting sections 120ts of the transmission lines 120, so that the electromagnetic wave signals are respectively transmitted to the emitting area EA with different delay times and radiated via a plurality of corresponding emitting antennas 140E. At this time, if the plurality of tunable dielectric units 161 in the emitting area EA are not enabled, the emitting direction of the electromagnetic wave may be modified on the YZ plane. Conversely, if the tunable dielectric units 161 are simultaneously enabled, the emitting direction of the electromagnetic wave may be modified on the YZ plane and the XZ plane at the same time.

Please refer to FIG. 10 and FIG. 11 at the same time, in the present embodiment, the first electrode layer EL1-A of the tunable dielectric units 160B has a bottom portion EL1bp parallel to the substrate 100 and a sidewall portion EL1sp extended from the bottom portion EL1bp in a bent manner, wherein a sidewall portion EL1sp surrounds the controllable dielectric layer CDL. More specifically, the controllable dielectric layer CDL of each of the tunable dielectric units 160B of the present embodiment is covered by the first electrode layer EL1-A. Therefore, it may be ensured that the driving of the controllable dielectric layer CDL of each of the tunable dielectric units 160B is not affected by the electrode of another tunable dielectric unit 160B.

However, the disclosure is not limited thereto. In another modified embodiment, each of the plurality of first electrode layers of the plurality of tunable dielectric units may have at least one notch, and the accommodating space configured to fill the liquid-crystal layer (i.e., the controllable dielectric layer CDL) between the substrate 100 and each of the plurality of first electrode layers of the plurality of tunable dielectric units may be communicated via the at least one notch. In other words, in the modified embodiment, the first electrode layers of the tunable dielectric units may be disposed in one continuously distributed liquid-crystal layer.

Further, in the present embodiment, the electromagnetic wave transmission structure 30 may further include an insulating layer INS1 and an insulating layer INS2. The insulating layer INS1 is provided between the first electrode layer EL1-A and the transmission line 120 so that the first electrode layer EL1-A and the transmission line 120 are electrically separated from each other. The insulating layer INS2 is provided between any two adjacent first electrode layers EL1-A so that any two adjacent first electrode layers EL1-A are electrically separated from each other. Moreover, since the distance between the two adjacent first electrode layers EL1-A respectively on two transmission lines 120 is farther in the present embodiment, the insulating layer INS2 may not be provided between two adjacent first electrode layers EL1-A arranged along the direction Y, but the disclosure is not limited thereto. In other embodiments, the insulating layer INS2 may also be disposed around the first electrode layer of each of the tunable dielectric units to insulate the adjacent first electrode layer of another tunable dielectric unit arranged in a different direction.

Figure 12:
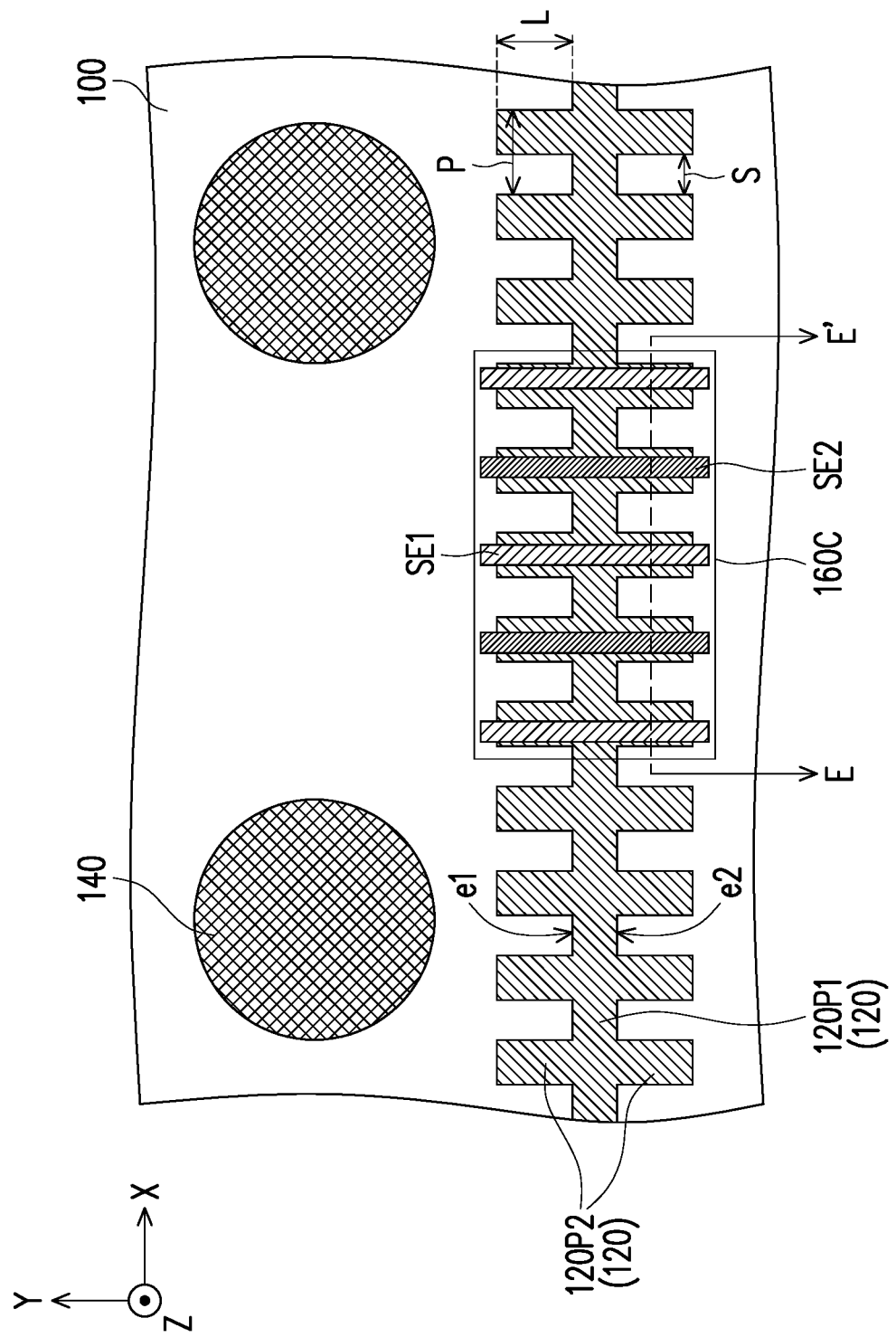
FIG. 12 is a schematic top view of an electromagnetic wave transmission structure of the fifth embodiment of the disclosure.
Figure 13A:
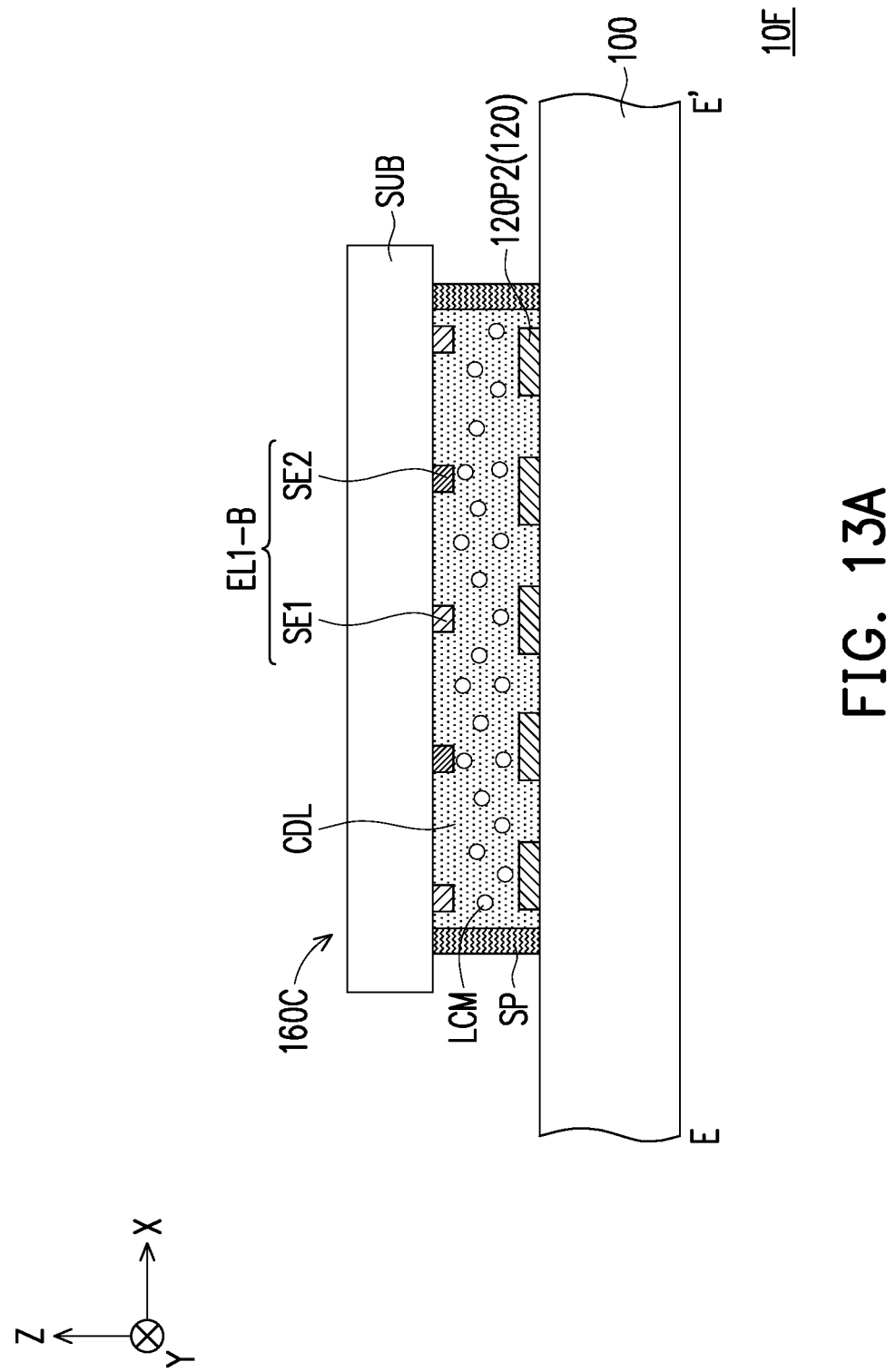
FIG. 13A and FIG. 13B are schematic cross-sectional views of the tunable dielectric units of FIG. 12 operated in different states.
Figure 13B:
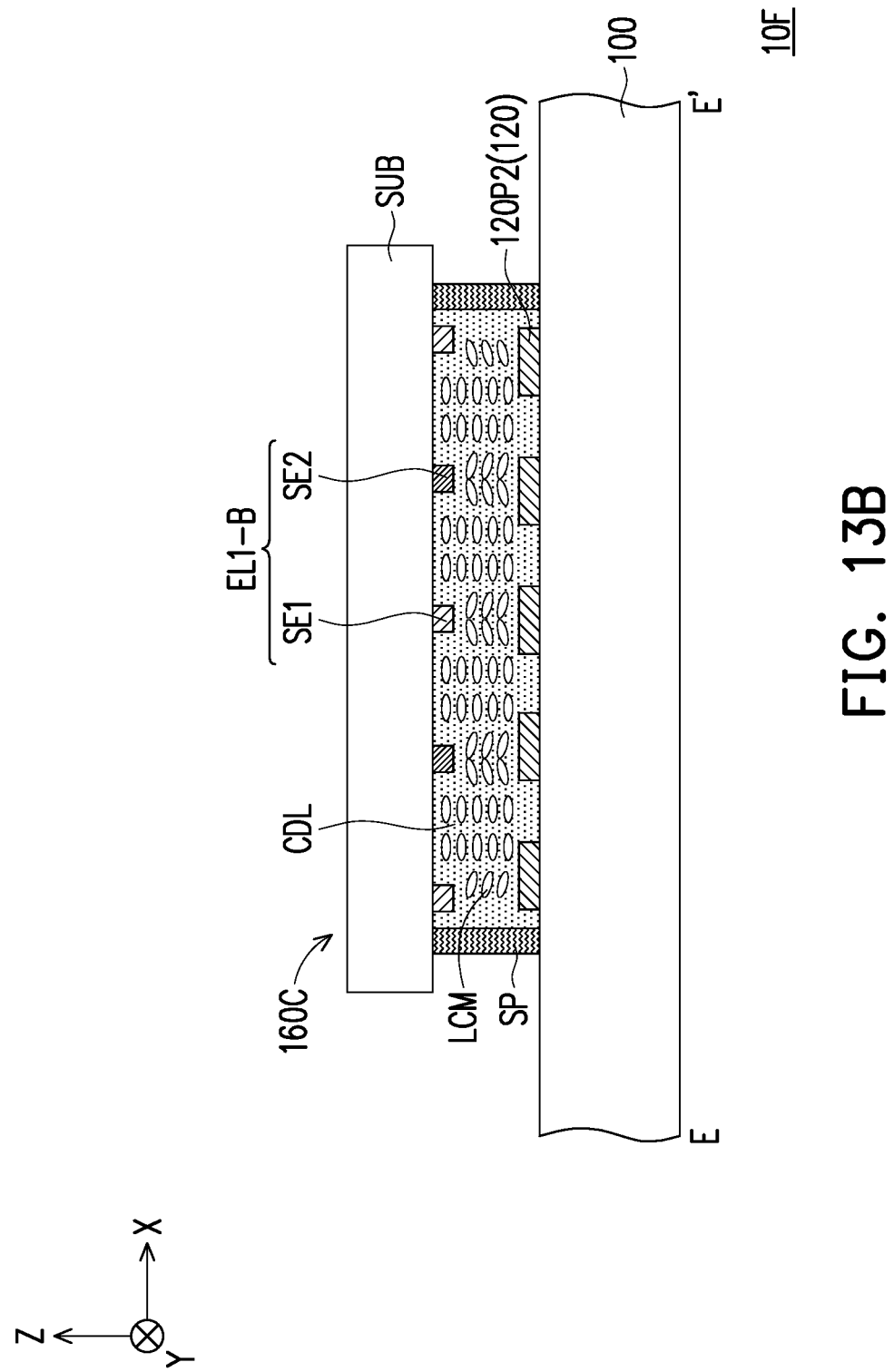

FIG. 12 is a schematic top view of an electromagnetic wave transmission structure of the fifth embodiment of the disclosure. FIG. 13A and FIG. 13B are schematic cross-sectional views of the tunable dielectric units of FIG. 12 operated in different states. FIG. 13A and FIG. 13B correspond to section line E-E' of FIG. 12. For the sake of clarity, FIG. 12 omits the illustration of the substrate SUB, the controllable dielectric layer CDL, and the spacer SP in FIG. 13A and FIG. 13B. Referring to FIG. 12 to FIG. 13B, the difference between an electromagnetic wave transmission structure 10F of the present embodiment and the electromagnetic wave transmission structure 10 of FIG. 3A is that the configuration of the first electrode layer of the tunable dielectric units and the driving method of the liquid-crystal layer are different.

Specifically, in the present embodiment, a first electrode layer EL1-B of tunable dielectric units 160C includes a plurality of first strip electrodes SE1 and a plurality of second strip electrodes SE2. The first strip electrodes SE1 and the second strip electrodes SE2 are alternately arranged along the extending direction (e.g., the direction X) of the first extending portion 120P1 of the transmission line 120, and are parallel to the second extending portions 120P2. In the present embodiment, the transmission line 120 is not used as an electrode configured to drive the controllable dielectric layer CDL. Instead, the effective dielectric constant of the controllable dielectric layer CDL is changed by the electric field generated between any adjacent ones of the first strip electrodes SE1 and the second strip electrodes SE2.

For example, in the present embodiment, when the plurality of liquid-crystal molecules LCM of the liquid-crystal layer of the controllable dielectric layer CDL are not applied with an electric field, the arrangement direction (i.e., the alignment direction) thereof is substantially parallel to the extending direction of the second extending portions 120P2 (as shown in FIG. 13A). When the first electrode layer EL1-B is enabled, a lateral electric field substantially parallel to the substrate 100 is formed between the first strip electrodes SE1 and the second strip electrodes SE2. Since the liquid-crystal material adopted in the present embodiment is a positive liquid-crystal material (that is, the dielectric constant $\varepsilon_{//}$ of the liquid-crystal molecules LCM in the long axis direction is greater than the dielectric constant $\varepsilon^{\perp}$ in the short axis direction), the long axis of the liquid-crystal molecules LCM tends to align along the direction of this transverse electric field (as shown in FIG. 13B). More specifically, the liquid-crystal layer of the present embodiment is operated in an in-plane switching (IPS) mode.

Different from the tunable dielectric units 160 of FIG. 3A and FIG. 3B, when the tunable dielectric units 160C of the present embodiment are not enabled, the effective dielectric constant of the controllable dielectric layer CDL in the direction of the electric field of the electromagnetic wave signal is the smaller dielectric constant and therefore less phase shift is generated. Conversely, when the tunable dielectric units 160C are enabled, the effective dielectric constant of the controllable dielectric layer CDL in the direction of the electric field of the electromagnetic wave signal is the larger dielectric constant $\varepsilon_{//}$, and therefore more phase shift is generated.

Figure 14:
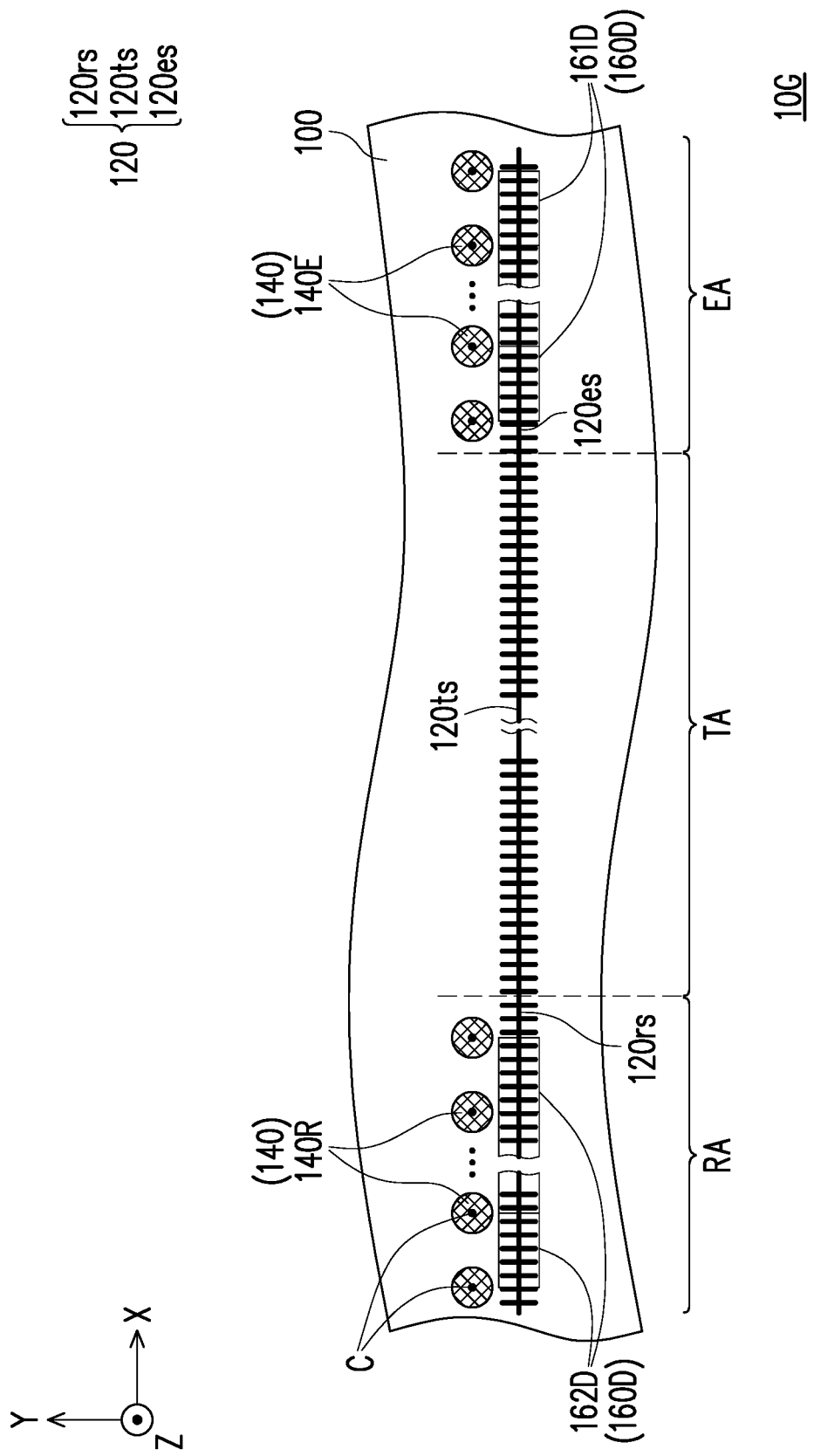
FIG. 14 is a schematic top view of an electromagnetic wave transmission structure of the sixth embodiment of the disclosure.

FIG. 14 is a schematic top view of an electromagnetic wave transmission structure of the sixth embodiment of the disclosure. Referring to FIG. 14, different from the electromagnetic wave transmission structure 10 of FIG. 1, a plurality of tunable dielectric units 160D of an electromagnetic wave transmission structure 10G of the present embodiment, for example: a plurality of tunable dielectric units 161D located in the emitting area EA or/and a plurality of tunable dielectric units 162D located in the receiving area RA, are arranged adjacent to each other. For example, for the tunable dielectric units 160D between two adjacent antennas 140, the boundaries of the two opposite sides in the arrangement direction of the two antennas 140 may be respectively aligned with the geometric center C of each of the two antennas 140.

That is, there is no gap between the plurality of tunable dielectric units 160D located in the receiving area RA or the emitting area EA. Therefore, when the electromagnetic wave signal is transmitted on the receiving section 120rs or the emitting section 120es of the transmission line 120, energy attenuation due to the discontinuity of the surrounding dielectric layer may be avoided.

Based on the above, in the electromagnetic wave transmission structure of an embodiment of the disclosure, a plurality of antennas are provided adjacent to the transmission line, and a plurality of tunable dielectric units are provided at a plurality of portions of the transmission line between the antennas. The phase of the electromagnetic wave signal may be changed by electronically modulating the effective dielectric constant of the controllable dielectric layer overlapped with the transmission line in the tunable dielectric units, thereby modulating the electromagnetic wave emitting and receiving directions of the antennas.

What is claimed is:

1. An electromagnetic wave transmission structure, comprising:
    a substrate;
    at least one transmission line disposed on the substrate, wherein each of the at least one transmission line comprises:
        a first extending portion extended in a first direction; and
        a plurality of second extending portions respectively extended from two opposite edges of the first extending portion, wherein an extending direction of the second extending portions is parallel to a second direction, the second extending portions are arranged at a pitch P along the first direction, any two adjacent ones of the second extending portions arranged along the first direction have a spacing S, and each of the second extending portions has a length L along the second direction;
    a plurality of antennas disposed on the substrate and adjacent to the at least one transmission line; and
    a plurality of tunable dielectric units overlapped at a plurality of portions of the at least one transmission line located between the antennas, wherein each of the tunable dielectric units has a first electrode layer and a controllable dielectric layer overlapped with each other, the controllable dielectric layer is disposed between the first electrode layer and the at least one transmission line, and the pitch P, the spacing S, and the length L satisfy the following relationship:

$$\left(\frac{S}{P}\right)^2 = \left[\left(\frac{ck_{sspp}}{\omega\sqrt{\varepsilon_r}}\right)^2 - 1\right]\cot^2\left(2L\sqrt{\varepsilon_r}\frac{\omega}{c}\right),$$

wherein $k_{sspp}$ is a wavenumber of an electromagnetic wave signal transmitted via the at least one transmission line, $\varepsilon_r$ is an effective dielectric constant of the controllable dielectric layer, $\omega$ is an angular frequency of the electromagnetic wave signal transmitted via the at least one transmission line, and c is a speed of light.

2. The electromagnetic wave transmission structure of claim 1, wherein each of the at least one transmission line has a transmitting section, a receiving section, and an emitting section, the transmitting section is connected between the receiving section and the emitting section, the tunable dielectric units comprise a plurality of first tunable dielectric units overlapped with one of the emitting section and the receiving section, and the antennas and the first tunable dielectric units adjacent to the one of the emitting section and the receiving section are alternately arranged along an extending direction of the at least one transmission line.

3. The electromagnetic wave transmission structure of claim 2, wherein the tunable dielectric units further comprise a plurality of second tunable dielectric units overlapped with another of the emitting section and the receiving section, and another portion of the antennas and the second tunable dielectric units adjacent to the other of the emitting section and the receiving section are alternately arranged along the extending direction.

4. The electromagnetic wave transmission structure of claim 3, wherein the at least one transmission line is a plurality of transmission lines extended in the first direction, the transmission lines are arranged along the second direction, the antennas are respectively adjacent to a plurality of the receiving section and a plurality of the emitting section of the transmission lines, the tunable dielectric units further comprise a plurality of third tunable dielectric units overlapped with a plurality of the transmitting section of the transmission lines, and the third tunable dielectric units are arranged in a plurality of columns and a plurality of rows along the first direction and the second direction, respectively.

5. The electromagnetic wave transmission structure of claim 4, wherein the first electrode layer of each of the tunable dielectric units has a bottom portion parallel to the substrate and a sidewall portion extended from the bottom portion in a bent manner, the sidewall portion surrounds the controllable dielectric layer, and the first electrode layer and the at least one transmission line are suitable for generating an electric field configured to change an effective dielectric constant of the controllable dielectric layer.

6. The electromagnetic wave transmission structure of claim 5, wherein an insulating layer is provided between the two sidewall portions of any two adjacent ones of the first electrode layers of the third tunable dielectric units arranged along the first direction.

7. The electromagnetic wave transmission structure of claim 1, wherein each of the at least one transmission line has a transmitting section, a receiving section, and an emitting section, the transmitting section is connected between the receiving section and the emitting section, the at least one transmission line is a plurality of transmission lines extended in the first direction, the transmission lines are arranged along the second direction, the antennas are respectively adjacent to a plurality of the receiving section and a plurality of the emitting section of the transmission lines, and at least a portion of the tunable dielectric units is overlapped with a plurality of the transmitting section of the transmission lines and arranged in a plurality of columns and a plurality of rows along the first direction and the second direction, respectively.

8. The electromagnetic wave transmission structure of claim 1, wherein the first electrode layer of each of the tunable dielectric units has a bottom portion parallel to the substrate and a sidewall portion extended from the bottom portion in a bent manner, the sidewall portion surrounds the controllable dielectric layer, and the first electrode layer and the at least one transmission line are suitable for generating an electric field configured to change an effective dielectric constant of the controllable dielectric layer.

9. The electromagnetic wave transmission structure of claim 1, wherein the at least one transmission line is one transmission line, a distance between each of the antennas and the transmission line is the same, the antennas are arranged along an extending direction of the transmission line and have a symmetry axis, and a diameter of each of the antennas is decreased or increased away from the symmetry axis.

10. The electromagnetic wave transmission structure of claim 1, wherein the at least one transmission line is one transmission line, a geometric center of each of the antennas is a same distance from the transmission line, the antennas are arranged along an extending direction of the transmission line and have a symmetry axis, and a diameter of each of the antennas is decreased or increased away from the symmetry axis.

11. The electromagnetic wave transmission structure of claim 1, wherein the at least one transmission line is one transmission line, each of the antennas has a same diameter, the antennas are arranged along an extending direction of the transmission line and have a symmetry axis, and a spacing between each of the antennas and the transmission line is increased away from the symmetry axis.

12. The electromagnetic wave transmission structure of claim 1, wherein each of the tunable dielectric units further comprises:
a second electrode layer disposed on a side surface of the substrate faced away from the at least one transmission line and overlapped with the controllable dielectric layer, wherein the first electrode layer and the second electrode layer are suitable for generating an electric field configured to change an effective dielectric constant of the controllable dielectric layer.

13. The electromagnetic wave transmission structure of claim 1, wherein the controllable dielectric layer is a liquid-crystal layer.

14. The electromagnetic wave transmission structure of claim 1, wherein the first electrode layer comprises a plurality of first strip electrodes and a plurality of second strip electrodes, the first strip electrodes and the second strip electrodes are alternately arranged along the first direction and parallel to the second extending portions, and any adjacent ones of the first strip electrodes and the second strip electrodes are suitable for generating an electric field configured to change an effective dielectric constant of the controllable dielectric layer.

* * * * *